US012695732B2

(12) United States Patent
Kim et al.

(10) Patent No.: US 12,695,732 B2
(45) Date of Patent: Jul. 28, 2026

(54) BROADCAST AND/OR GROUPCAST SECURITY FOR DEVICE-TO-DEVICE POSITIONING

(71) Applicant: QUALCOMM Incorporated, San Diego, CA (US)

(72) Inventors: Hongil Kim, San Diego, CA (US); Soo Bum Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 18/520,295

(22) Filed: Nov. 27, 2023

(65) Prior Publication Data

US 2024/0235823 A1 Jul. 11, 2024

Related U.S. Application Data

(60) Provisional application No. 63/478,647, filed on Jan. 5, 2023.

(51) Int. Cl.
*H04L 9/40* (2022.01)
*H04L 9/08* (2006.01)
(Continued)

(52) U.S. Cl.
CPC ........ *H04L 63/0428* (2013.01); *H04L 9/0833* (2013.01); *H04L 9/0866* (2013.01);
(Continued)

(58) Field of Classification Search
CPC ....... H04L 9/0643; H04L 9/08; H04L 9/0816; H04L 9/0819; H04L 9/0822;
(Continued)

(56) References Cited

U.S. PATENT DOCUMENTS

| | | | | |
|---|---|---|---|---|
| 10,560,843 | B2 * | 2/2020 | Suh | H04W 12/06 |
| 2011/0154029 | A1 * | 6/2011 | Hahn | H04W 12/041 |
| | | | | 713/160 |

(Continued)

FOREIGN PATENT DOCUMENTS

| | | |
|---|---|---|
| KR | 20160088832 A | 7/2016 |
| WO | WO-2024186985 | 9/2024 |
| WO | WO-2024208178 A1 | 10/2024 |

OTHER PUBLICATIONS

3GPP TS 23.287: 3GPP, Technical Specification Group Services and System Aspects, Architecture Enhancements for 5G System to Support Vehicle-to-everything (V2X) Services (Release 16), 3GPP Standard, Technical Specification, 3GPP TS 23.287, 3rd Generation Partnership Project, Mobile Competence Centre, 650, Route Des Lucioles, F-06921 Sophia-Antipolis Cedex, France, vol. SA WG2, No. V16.1.0, Dec. 22, 2019, pp. 1-51, XP051840922, clause 5.2.1.3 Groupcast mode communication over PC5 reference point.

(Continued)

*Primary Examiner* — Shaqueal D Wade-Wright
(74) *Attorney, Agent, or Firm* — Polsinelli LLP

(57) ABSTRACT

Disclosed are techniques for performing wireless communication. In some aspects, a wireless communication device may perform operations including generating, at a user equipment (UE), a message including information associated with positioning-reference signaling. The operations may include obtaining: a group identifier, a group key, and a group-key identifier. The operations may include deriving a traffic key based on the group key and the group identifier. The operations may include deriving an encryption key and an integrity key based on the traffic key. The operations may include generating a message header including the group identifier and the group-key identifier. The operations may include calculating a message-authentication code (MAC) using the integrity key, the message, and the message header.

(Continued)

The operations may include encrypting the message and the MAC using the encryption key. The operations may include transmitting the message header, the encrypted message, and the encrypted MAC.

30 Claims, 12 Drawing Sheets

(51) Int. Cl.
   *H04L 9/32* (2006.01)
   *H04W 12/03* (2021.01)
   *H04W 12/041* (2021.01)
(52) U.S. Cl.
   CPC ............ *H04L 9/3242* (2013.01); *H04L 63/12* (2013.01); *H04W 12/03* (2021.01); *H04L 9/0861* (2013.01); *H04L 2209/80* (2013.01); *H04W 12/041* (2021.01)
(58) Field of Classification Search
   CPC ... H04L 9/0833; H04L 9/0861; H04L 9/0866; H04L 9/0872; H04L 9/14; H04L 9/32; H04L 9/3242; H04L 2209/80; H04L 63/062; H04L 63/04; H04L 63/0428; H04L 63/0492; H04L 63/0442; H04L 63/065; H04L 63/06; H04L 63/0876; H04L 63/12; H04L 63/123; H04W 12/03; H04W 12/04; H04W 12/041
   See application file for complete search history.

(56) References Cited

U.S. PATENT DOCUMENTS

| | | | | |
|---|---|---|---|---|
| 2012/0177199 | A1* | 7/2012 | Baek ..................... | G06F 21/602 |
| | | | | 380/270 |
| 2014/0185595 | A1* | 7/2014 | Wu ................... | H04W 56/0045 |
| | | | | 370/336 |
| 2019/0162843 | A1 | 5/2019 | Jiang et al. | |
| 2021/0051005 | A1* | 2/2021 | Kunz ................... | H04W 12/04 |
| 2024/0107492 | A1* | 3/2024 | Michalopoulos ..... | G01S 5/0236 |
| 2025/0008537 | A1* | 1/2025 | Sahin ................... | H04W 76/14 |
| 2025/0168808 | A1* | 5/2025 | Ramachandran ..... | H04W 24/10 |

OTHER PUBLICATIONS

Huawei et al., "PC5 Signalling Connection Management for V2X Services", 3GPP TSG-SA WG2 Meeting #134, S2-1908228 (Revision of S2-1908218), Was 8218 23287 PC5, 3rd Generation Partnership Project, Mobile Competence Centre, 650, Route Des Lucioles, F-06921 SOP, Sophia-Antipolis Cedex, France, vol. SA WG2, No. Sapporo, Japan, Jun. 24, 2019-Jun. 28, 2019, Jun. 24-Jun. 28, XP051756824, 2019, pp. 1-4.
International Search Report and Written Opinion—PCT/US2023/081293—ISA/EPO—Apr. 2, 2024.

\* cited by examiner

250

270

LMF

260

5GC

266

264

AMF    SMF    UPF    262

265    265    263    263    220

NEW RAN 224    ng-eNB    gNB    222

223

204

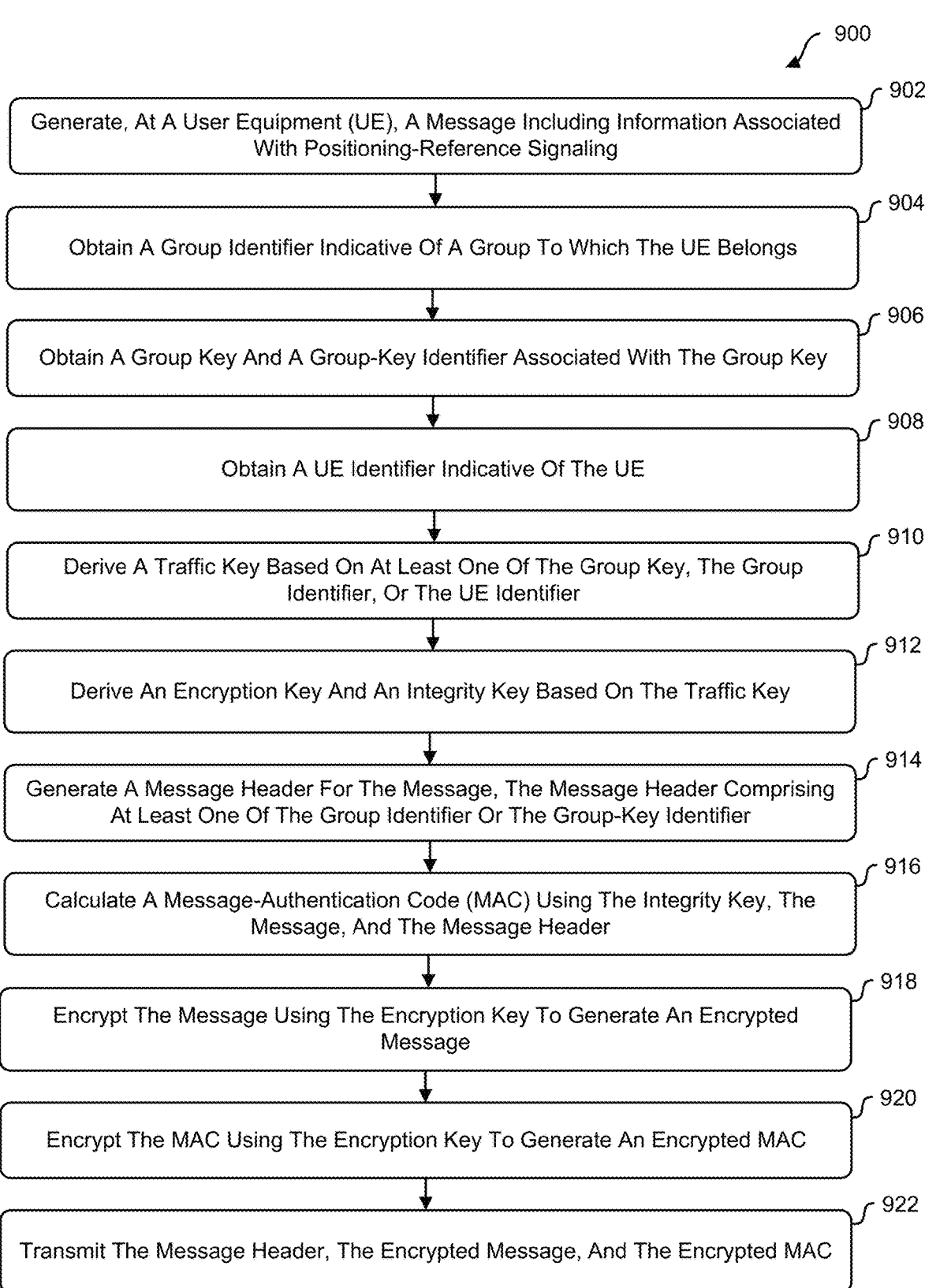

900

902
Generate, At A User Equipment (UE), A Message Including Information Associated With Positioning-Reference Signaling 904
Obtain A Group Identifier Indicative Of A Group To Which The UE Belongs 906
Obtain A Group Key And A Group-Key Identifier Associated With The Group Key 908
Obtain A UE Identifier Indicative Of The UE 910
Derive A Traffic Key Based On At Least One Of The Group Key, The Group Identifier, Or The UE Identifier 912
Derive An Encryption Key And An Integrity Key Based On The Traffic Key 914
Generate A Message Header For The Message, The Message Header Comprising At Least One Of The Group Identifier Or The Group-Key Identifier 916
Calculate A Message-Authentication Code (MAC) Using The Integrity Key, The Message, And The Message Header 918
Encrypt The Message Using The Encryption Key To Generate An Encrypted Message 920
Encrypt The MAC Using The Encryption Key To Generate An Encrypted MAC 922
Transmit The Message Header, The Encrypted Message, And The Encrypted MAC

FIG. 9

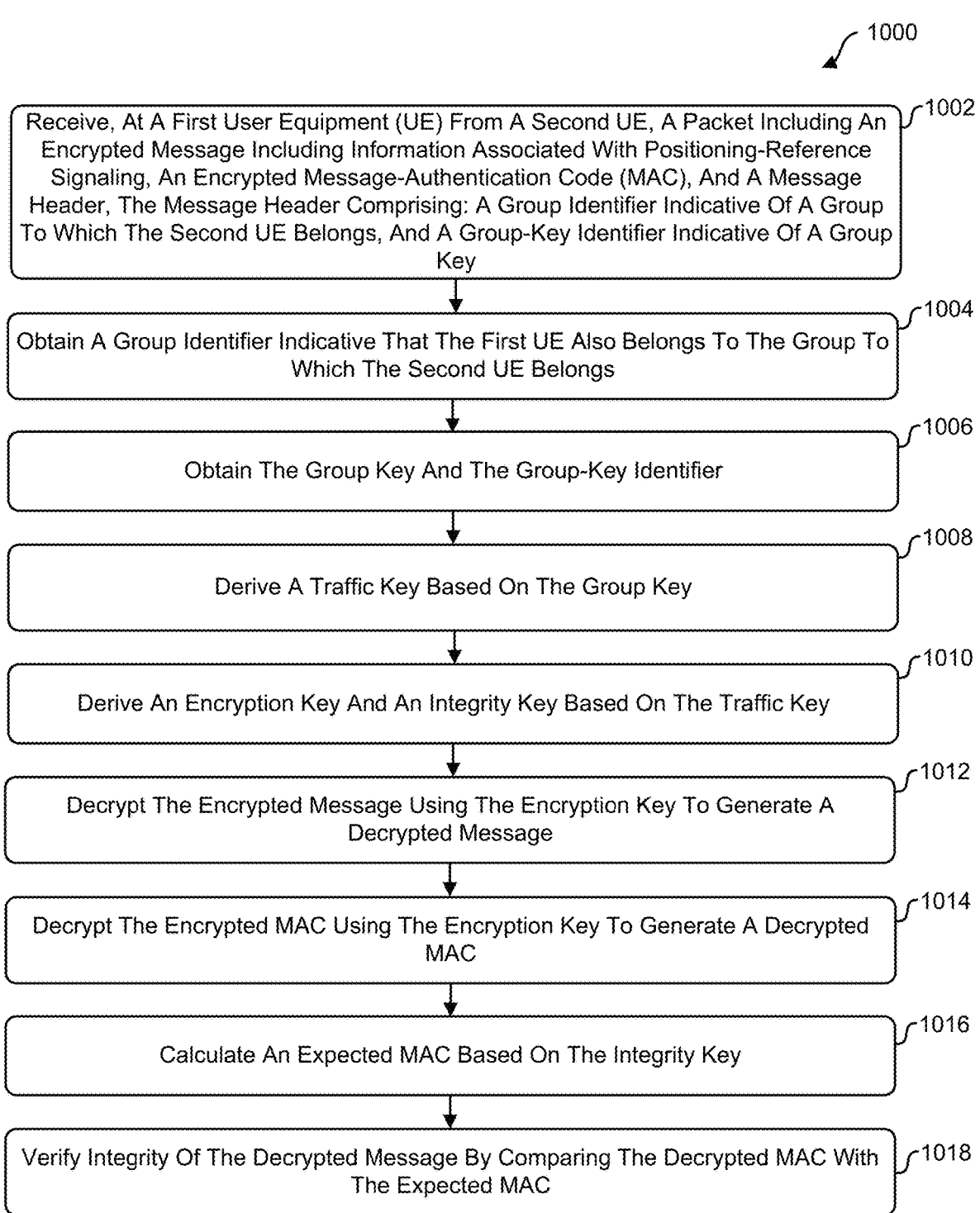

```
                                                            ⌐ 1000

┌──────────────────────────────────────────────────────┐ ⌐1002
│ Receive, At A First User Equipment (UE) From A Second  │
│ UE, A Packet Including An Encrypted Message Including   │
│ Information Associated With Positioning-Reference       │
│ Signaling, An Encrypted Message-Authentication Code     │
│ (MAC), And A Message Header, The Message Header         │
│ Comprising: A Group Identifier Indicative Of A Group    │
│ To Which The Second UE Belongs, And A Group-Key         │
│ Identifier Indicative Of A Group Key                    │
└──────────────────────────────────────────────────────┘
                          │
                          ▼
┌──────────────────────────────────────────────────────┐ ⌐1004
│ Obtain A Group Identifier Indicative That The First UE  │
│ Also Belongs To The Group To Which The Second UE        │
│ Belongs                                                 │
└──────────────────────────────────────────────────────┘
                          │
                          ▼
┌──────────────────────────────────────────────────────┐ ⌐1006
│ Obtain The Group Key And The Group-Key Identifier       │
└──────────────────────────────────────────────────────┘
                          │
                          ▼
┌──────────────────────────────────────────────────────┐ ⌐1008
│ Derive A Traffic Key Based On The Group Key             │
└──────────────────────────────────────────────────────┘
                          │
                          ▼
┌──────────────────────────────────────────────────────┐ ⌐1010
│ Derive An Encryption Key And An Integrity Key Based On  │
│ The Traffic Key                                         │
└──────────────────────────────────────────────────────┘
                          │
                          ▼
┌──────────────────────────────────────────────────────┐ ⌐1012
│ Decrypt The Encrypted Message Using The Encryption Key  │
│ To Generate A Decrypted Message                         │
└──────────────────────────────────────────────────────┘
                          │
                          ▼
┌──────────────────────────────────────────────────────┐ ⌐1014
│ Decrypt The Encrypted MAC Using The Encryption Key To   │
│ Generate A Decrypted MAC                                │
└──────────────────────────────────────────────────────┘
                          │
                          ▼
┌──────────────────────────────────────────────────────┐ ⌐1016
│ Calculate An Expected MAC Based On The Integrity Key    │
└──────────────────────────────────────────────────────┘
                          │
                          ▼
┌──────────────────────────────────────────────────────┐ ⌐1018
│ Verify Integrity Of The Decrypted Message By Comparing  │
│ The Decrypted MAC With The Expected MAC                 │
└──────────────────────────────────────────────────────┘
```

FIG. 10

BROADCAST AND/OR GROUPCAST SECURITY FOR DEVICE-TO-DEVICE POSITIONING

CROSS-REFERENCE TO RELATED APPLICATIONS

This application claims priority to U.S. Provisional Patent Application No. 63/478,647, filed Jan. 5, 2023, which is hereby incorporated by reference, in its entirety and for all purposes.

FIELD OF THE DISCLOSURE

Aspects of the present disclosure generally relate to wireless communication. In some implementations, examples are described for providing broadcast and/or groupcast security for device-to-device positioning (e.g., PC5 sidelink positioning, Dedicated Short Range Communication (DSRC) sidelink positioning, and/or other device-to-device positioning).

BACKGROUND OF THE DISCLOSURE

Wireless communications systems are deployed to provide various telecommunication services, including telephony, video, data, messaging, broadcasts, among others. Wireless communications systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communications systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

Aspects of LTE, 5G, and/or other communications protocols may support direct communications between devices, which may be referred to as sidelink communications. As used herein, sidelink or sidelink communications generally refers to any direct device-to-device communication protocol. For example, the term sidelink may refer to 3GPP sidelink (e.g., using a PC5 sidelink interface). Sidelink may also refer to a Wi-Fi protocol for direct device-to-device communications, referred to as Dedicated Short-Range Communication (DSRC) protocol. As the demand for mobile broadband access and general communications continues to increase, further improvements in 5G, LTE, and other radio access technologies, as well as other communications technologies (e.g., WiFi, etc.), remain useful.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one example, a method is provided for wireless communication. The method may include: generating, at a user equipment (UE), a message including information associated with positioning-reference signaling; obtaining a group identifier indicative of a group to which the UE belongs; obtaining a group key and a group-key identifier associated with the group key; obtaining a UE identifier indicative of the UE; deriving a traffic key based on at least one of the group key, the group identifier, or the UE identifier; deriving an encryption key and an integrity key based on the traffic key; generating a message header for the message, the message header comprising at least one of the group identifier or the group-key identifier; calculating a message-authentication code (MAC) using the integrity key, the message, and the message header; encrypting the message using the encryption key to generate an encrypted message; encrypting the MAC using the encryption key to generate an encrypted MAC; and transmitting the message header, the encrypted message, and the encrypted MAC.

In another example, a wireless communication device for wireless communication is provided that includes at least one memory and at least one processor (e.g., configured in circuitry) communicatively coupled to the memory. The at least one processor may be configured to: generate, at a user equipment (UE), a message including information associated with positioning-reference signaling; obtaining a group identifier indicative of a group to which the UE belongs; obtain a group key and a group-key identifier associated with the group key; obtain a UE identifier indicative of the UE; derive a traffic key based on at least one of the group key, the group identifier, or the UE identifier; derive an encryption key and an integrity key based on the traffic key; generate a message header for the message, the message header comprising at least one of the group identifier or the group-key identifier; calculate a message-authentication code (MAC) using the integrity key, the message, and the message header; encrypt the message using the encryption key to generate an encrypted message; encrypt the MAC using the encryption key to generate an encrypted MAC; and transmit the message header, the encrypted message, and the encrypted MAC.

In another example, a non-transitory computer-readable medium of a wireless communication device is provided that includes stored thereon at least one instruction that, when executed by one or more processors, may cause the one or more processors to: generate, at a user equipment (UE), a message including information associated with positioning-reference signaling; obtaining a group identifier indicative of a group to which the UE belongs; obtain a group key and a group-key identifier associated with the group key; obtain a UE identifier indicative of the UE; derive a traffic key based on at least one of the group key, the group identifier, or the UE identifier; derive an encryption key and an integrity key based on the traffic key; generate a message header for the message, the message header comprising at least one of the group identifier or the group-key identifier; calculate a message-authentication code (MAC) using the integrity key, the message, and the message header; encrypt the message using the encryption key to generate an encrypted message; encrypt the MAC using the encryption key to generate an encrypted MAC; and transmit the message header, the encrypted message, and the encrypted MAC.

In another example, an apparatus for wireless communication is provided. The apparatus may include: means for generating, at a user equipment (UE), a message including information associated with positioning-reference signaling; means for obtaining a group identifier indicative of a group to which the UE belongs; means for obtaining a group key and a group-key identifier associated with the group key; means for obtaining a UE identifier indicative of the UE; means for deriving a traffic key based on at least one of the group key, the group identifier, or the UE identifier; means for deriving an encryption key and an integrity key based on the traffic key; means for generating a message header for the message, the message header comprising at least one of the group identifier or the group-key identifier; means for calculating a message-authentication code (MAC) using the integrity key, the message, and the message header; means for encrypting the message using the encryption key to generate an encrypted message; means for encrypting the MAC using the encryption key to generate an encrypted MAC; and means for transmitting the message header, the encrypted message, and the encrypted MAC.

According to at least one other example, a method is provided for wireless communication. The method may include: receiving, at a first user equipment (UE) from a second UE, a packet including an encrypted message associated with positioning-reference signaling, an encrypted message-authentication code (MAC), and a message header, the message header comprising: a group identifier indicative of a group to which the second UE belongs, and a group-key identifier indicative of a group key; obtaining a group identifier indicative that the first UE also belongs to the group to which the second UE belongs; obtaining the group key and the group-key identifier; deriving a traffic key based on the group key; deriving an encryption key and an integrity key based on the traffic key; decrypting the encrypted message using the encryption key to generate a decrypted message; decrypting the encrypted MAC using the encryption key to generate a decrypted MAC; calculating an expected MAC based on the integrity key; and verifying integrity of the decrypted message by comparing the decrypted MAC with the expected MAC.

In another example, a wireless communication device for wireless communication is provided that includes at least one memory and at least one processor (e.g., configured in circuitry) communicatively coupled to the memory. The at least one processor may be configured to: receive, at a first user equipment (UE) from a second UE, a packet including an encrypted message associated with positioning-reference signaling, an encrypted message-authentication code (MAC), and a message header, the message header comprising: a group identifier indicative of a group to which the second UE belongs, and a group-key identifier indicative of a group key; obtain a group identifier indicative that the first UE also belongs to the group to which the second UE belongs; obtain the group key and the group-key identifier; derive a traffic key based on the group key; derive an encryption key and an integrity key based on the traffic key; decrypt the encrypted message using the encryption key to generate a decrypted message; decrypt the encrypted MAC using the encryption key to generate a decrypted MAC; calculate an expected MAC based on the integrity key; and verify integrity of the decrypted message by comparing the decrypted MAC with the expected MAC.

In another example, a non-transitory computer-readable medium of a wireless communication device is provided that includes stored thereon at least one instruction that, when executed by one or more processors, may cause the one or more processors to: receive, at a first user equipment (UE) from a second UE, a packet including an encrypted message associated with positioning-reference signaling, an encrypted message-authentication code (MAC), and a message header, the message header comprising: a group identifier indicative of a group to which the second UE belongs, and a group-key identifier indicative of a group key; obtain a group identifier indicative that the first UE also belongs to the group to which the second UE belongs; obtain the group key and the group-key identifier; derive a traffic key based on the group key; derive an encryption key and an integrity key based on the traffic key; decrypt the encrypted message using the encryption key to generate a decrypted message; decrypt the encrypted MAC using the encryption key to generate a decrypted MAC; calculate an expected MAC based on the integrity key; and verify integrity of the decrypted message by comparing the decrypted MAC with the expected MAC.

In another example, an apparatus for wireless communication is provided. The apparatus may include: means for receiving, at a first user equipment (UE) from a second UE, a packet including an encrypted message associated with positioning-reference signaling, an encrypted message-authentication code (MAC), and a message header, the message header comprising: a group identifier indicative of a group to which the second UE belongs, and a group-key identifier indicative of a group key; means for obtaining a group identifier indicative that the first UE also belongs to the group to which the second UE belongs; means for obtaining the group key and the group-key identifier; means for deriving a traffic key based on the group key; means for deriving an encryption key and an integrity key based on the traffic key; means for decrypting the encrypted message using the encryption key to generate a decrypted message; means for decrypting the encrypted MAC using the encryption key to generate a decrypted MAC; means for calculating an expected MAC based on the integrity key; and means for verifying integrity of the decrypted message by comparing the decrypted MAC with the expected MAC.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 9 is a flow diagram illustrating an example of a process for providing security for sidelink positioning, according to aspects of the disclosure.

FIG. 10 is a flow diagram illustrating another example of a process for providing security for sidelink positioning, according to aspects of the disclosure.

DETAILED DESCRIPTION

Figure 1:
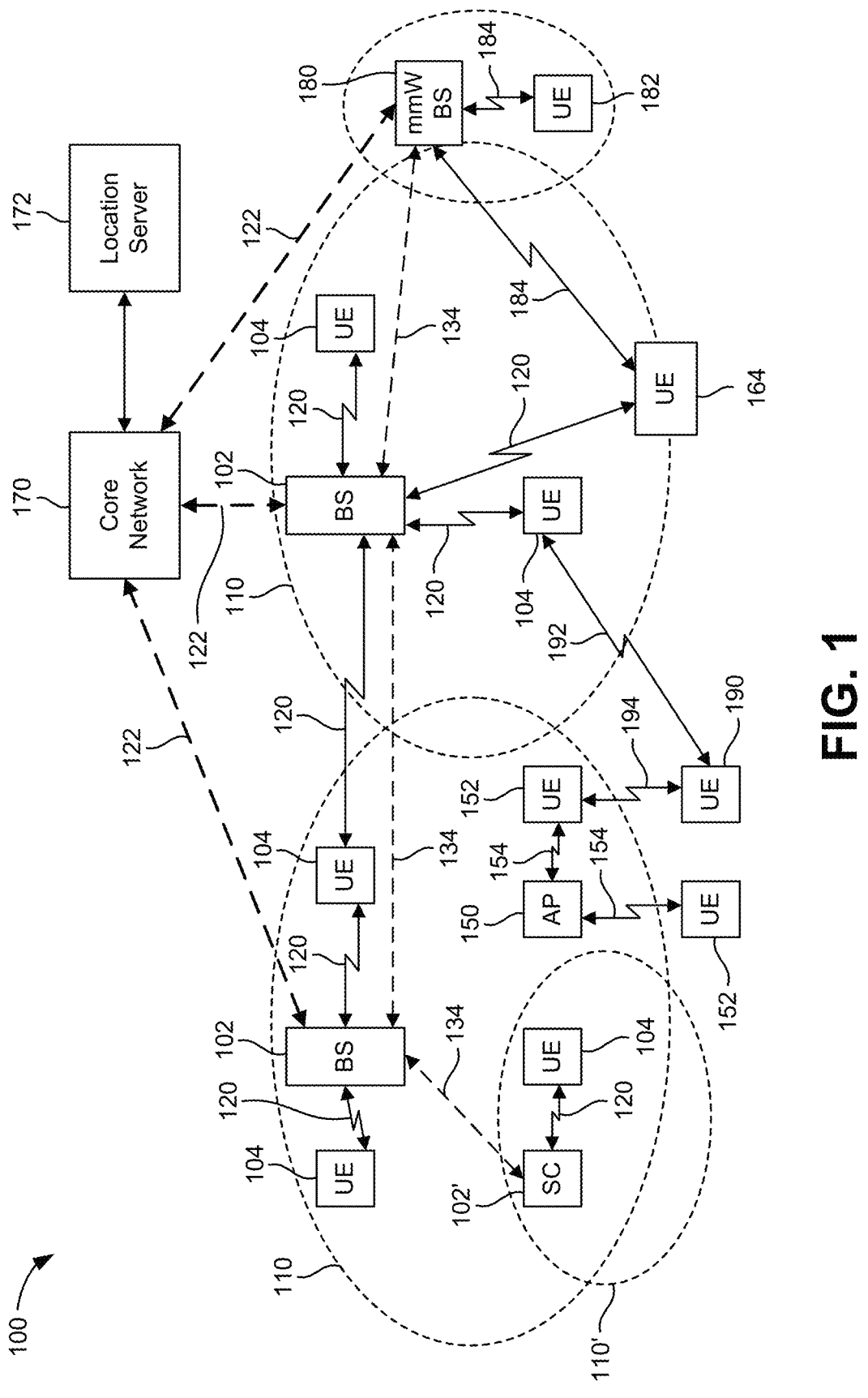
FIG. 1 illustrates an exemplary wireless communications system, according to aspects of the disclosure.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

Wireless communication networks are deployed to provide various communication services such as voice, video, packet data, messaging, broadcast, and the like. A wireless communication network may support both access links and sidelinks for communication between wireless devices. An access link may refer to any communication link between a client device (e.g., a user equipment (UE), a station (STA), or other client device) and a base station (e.g., a 3GPP gNB, a 3GPP eNB, a Wi-Fi access point (AP), or other base station). For example, an access link may support uplink signaling, downlink signaling, connection procedures, etc.

A sidelink may refer to any communication link between client devices (e.g., UEs, STAs, etc.). For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one UE to one or more other UEs. In some examples, sidelink communications may be transmitted using a licensed frequency spectrum or an unlicensed frequency spectrum (e.g., 5 GHz or 6 GHz). As used herein, the term sidelink may refer to 3GPP sidelink (e.g., using a PC5 sidelink interface), Wi-Fi direct communications (e.g., according to a Dedicated Short-Range Communication (DSRC) protocol), or using any other direct device-to-device communication protocol.

In some configurations, a UE may use sidelink communications to implement sidelink positioning algorithms. In some cases, sidelink positioning algorithms may be used to obtain a higher degree of accuracy than may be obtained by using more traditional positioning techniques such as a Global Navigation Satellite System (GNSS). For instance, some sidelink applications (e.g., V2X applications and/or other applications) have very high accuracy requirements. In one illustrative example, sub-meter level accuracy may be necessary to support vehicle maneuver coordination (e.g., coordinating a lane change, automatic breaking of a target vehicle based on the location of another vehicle, etc.). In such cases, a large bandwidth (e.g., approximately 80 MHz or higher) positioning signal (e.g., Positioning Reference Signal (PRS), etc.) transmission may be necessary. Sidelink positioning signals SL PRS may thus be transmitted over an intelligent transport system (ITS) band, a licensed band, or an unlicensed band, depending on regional regulations, positioning Quality of Service (QoS) requirements, etc.

Sidelink positioning may support both relative and absolute positioning. For instance, relative positioning (also referred to as ranging) can include determining a distance between two UEs (e.g., between a pedestrian UE and an RSU, between two pedestrian UEs, between two vehicle UEs, between a pedestrian UE and a vehicle UE, etc.). Absolute positioning can include determining a global location (e.g., by determining geographical coordinates) of a target UE.

In some cases, sidelink positioning may be performed based on measurement of one or more sidelink positioning signals (e.g., a sidelink PRS, a Channel State Information (CSI) reference signal (CSI-RS), Sounding Reference Signal (SRS), etc.) transmitted over sidelink from one UE to another UE. For instance, a sidelink PRS can be transmitted over sidelink. The positioning can be based on measurements of Time of Arrival (ToA), Time Difference of Arrival (TDoA), Angle of Arrival (AoA), Round-Trip Time (RTT), or other positioning-based determination of the sidelink PRS, CSI-RS, SRS, etc. For simplicity, sidelink positioning signals may be referred to as "PRSs" or as "PRS signals" or individually as a "PRS" or a "PRS signal."

Sidelink positioning may be performed with or without network involvement. For example, the UE may perform scheduling of sidelink positioning resources autonomously (Mode 2) without network involvement. In another example, scheduling of sidelink positioning resources may be performed by a base station (Mode 1). In some cases, one or both of the sidelink positioning signals (e.g., PRS, etc.) and the positioning-assistance messages may be scheduled by a base station (e.g., a gNB, an eNB, an AP, etc.) in Mode 1 operation.

Systems, apparatuses, processes (also referred to as methods), and computer-readable media (collectively referred to as "systems and techniques") are described herein for providing security for sidelink positioning. The systems and techniques provide security for sidelink-positioning signaling between client devices (e.g., UEs). As noted above, the sidelink communications may be performed according to 3GPP communication protocols (e.g., using a PC5 sidelink interface according to LTE, 5G, etc.), Wi-Fi direct communication protocols (e.g., DSRC protocol), or using any other device-to-device communication protocol.

In some cases, transmission of positioning-assistance messages may be used for positioning. For instance, a positioning-assistance message may be sent prior to and/or following transmission of a PRS. A position-assistance message sent prior to a PRS may be referred to herein as a "PrePRS message," a "PrePRS signal," or a "PrePRS." A position-assistance message sent after a PRS signal may be referred to herein as a "PostPRS message," a "PostPRS signal," or a "PostPRS." Positioning-assistance messages (whether PrePRS or PostPRS) can carry sidelink-positioning-related configuration information (e.g., PRS configuration, etc.), sidelink-positioning related measurements (e.g., ToA measurements, TDoA measurements, RTT measurements, etc.), participant information indicating one or more intended recipients of a PRS, session information associated with communications between UEs (including e.g., spectrum to be used for PRS signals), PRS measurements indicative of a signal strength of a received PRS, location information associate with a location of the UE, motion information associated with motion of the UE, any combination thereof, and/or other information. In some cases, a UE may broadcast, or groupcast, PrePRS messages (and/or PostPRS messages) to identify other UEs that will participate in sidelink positioning, to initiate communications with the other UEs, to provide location information to the other UEs, any combination thereof, and/or to perform other operations. However, there lacks a mechanism to provide security for positioning-assistance messages.

The systems and techniques described herein provide security for positioning-assistance messages (and/or for sidelink positioning generally) by providing a scheme by which the various UEs exchange information and generate keys to encrypt and authenticate transmissions. For example, a first UE may obtain a group key (associated with a group of UEs that includes the first UE) and an algorithm identifier indicative of an algorithm. In the present disclosure, the term "group key" may refer to a cryptographic key shared by and/or associated with a group of UEs. The first UE may derive an encryption key and an integrity key based on the group key using the algorithm. In the present disclosure, the term "integrity key" may refer to a cryptographic key that may be used to verify the integrity of a message. The first UE may calculate a message-authentication code (MAC), based on a message (e.g., a positioning-assistance message) to be transmitted, using the integrity key. The first UE may encrypt the message and the MAC using the encryption key. The first UE may transmit a group identifier (indicative of the group of the first UE), the encrypted message, and the encrypted MAC (e.g., in a packet). In the present disclosure, the term "group identifier" may refer to an identifier (e.g., a number or code) that may be associated with and/or may be used to identify a group of UEs, used to identify UEs of the group, and/or used to identify the group. In this way, the first UE may secure the message by encrypting the message before broadcasting, or groupcasting, the message.

Additionally or alternatively, a second UE may receive the transmitted group identifier, the encrypted message, and the encrypted MAC (e.g., in the packet). The second UE may derive the encryption key and the integrity key, based on the group identifier of the first UE, using the algorithm. For example, the second UE may derive the encryption key and the integrity key using a technique related to (e.g., the same as) the technique used by the first UE to derive the encryption key and the integrity key. For example, both the first UE and the second UE may be part of the group identified by the group identifier. Both the first UE and the second UE may obtain the same algorithm identifier (e.g., from another source) responsive to the first and second UEs being part of the group. Additionally or alternatively, the first UE may transmit an algorithm identifier indicative of the algorithm along with the encrypted message (e.g., in a header). Further, the second UE may obtain the group key from the same source from which the first UE obtained the group key (e.g., based on both the first and second UEs being part of the group). Thus, the second UE may be enabled to derive the same encryption key and integrity key that were derived by the first UE using the algorithm and the group key.

The second UE may decrypt the message and the encrypted MAC. The second UE may generate an expected MAC based on the integrity key and the message. For example, the second UE may generate the expected MAC using a technique related to (e.g., the same as) the technique used by the first UE to generate the MAC. The second UE may authenticate the message by comparing the decrypted MAC with the expected MAC. In this way, the second UE may authenticate the message (e.g., before trusting content of the message), thus providing integrity to the message. A similar technique can be used by one or more other UEs in the group identified by the group identifier.

In some aspects, the systems and techniques can use a sidelink positioning protocol (SLPP) layer of a communication model. For example, a communication stack between two or more UEs may include, from bottom to top, a physical layer (PHY), a media access control layer, a radio control link (RLC) layer, a packet data convergence (PDCP) layer, a vehicle to everything (V2X)/proximity security (ProSe) layer, and an SLPP layer. The systems and techniques can implement security schemes in the SLPP layer, which may use, or rely on, any or all of the PHY layer, the media access control layer, the RCL layer, the PCDP layer, or the V2X/ProSe layer.

Providing security for positioning-assistance messages may provide various advantages, such as allowing the content of positioning-assistance messages to be unavailable to or unreadable by unintended recipients and/or preventing positioning-assistance messages from being spoofed by attackers, among others.

Additional aspects of the present disclosure are described in more detail below.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable device (e.g., smart watch, glasses, an extended reality (XR) device such as a virtual reality (VR) headset, an augmented reality (AR) headset or glasses, or a mixed reality (MR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "user device," a "user terminal" or UT, a "client device," a "wireless device," a "wireless communication device," a "subscriber device," a "subscriber terminal," a "subscriber station," a "mobile device," a "mobile terminal," a "mobile station," or variations thereof. Generally, UEs may communicate with a core network via a RAN, and through the core network the UEs may be connected with external networks such as the Internet and with other UEs. UEs may also communicate with other UEs and/or other devices as described herein. In some cases, other mechanisms of connecting to the core network, the Internet, and other UEs are also possible for the UEs, such as over wired access networks, wireless local area network (WLAN) networks (e.g., based on IEEE 802.11, based on ultra-wideband (UWB), etc.), and so on.

A base station may operate according to one of several RATs in communication with UEs, RSUs, and/or other devices, depending on the network in which it is deployed. In some cases, a base station may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs may send signals to a base station is called an uplink (UL) channel (e.g., a reverse traffic channel, a reverse control channel, an access channel, etc.). A communication link through which the base station may send signals to UEs is called a downlink (DL) or forward link channel (e.g., a paging channel, a control channel, a broadcast channel, a forward traffic channel, etc.). As used herein the term traffic channel (TCH) may refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

A roadside unit (RSU) is a device that may transmit and receive messages over a communications link or interface (e.g., a cellular-based sidelink or PC5 interface, an 802.11 or WiFi™ based Dedicated Short-Range Communication (DSRC) interface, and/or other interface) to and from one or more UEs, other RSUs, and/or base stations. An example of messages that may be transmitted and received by an RSU includes vehicle-to-everything (V2X) messages, which are described in more detail below. RSUs may be located on various transportation infrastructure systems, including roads, bridges, parking lots, toll booths, and/or other infrastructure systems. In some examples, an RSU may facilitate communication between UEs (e.g., vehicles, pedestrian user devices, and/or other UEs) and the transportation infrastructure systems. In some implementations, a RSU may be in communication with a server, base station, and/or other system that may perform centralized management functions.

An RSU may communicate with a communications system of a UE. For example, an intelligent transport system (ITS) of a UE (e.g., a vehicle and/or other UE) may be used to generate and sign messages for transmission to an RSU and to validate messages received from an RSU. An RSU may communicate (e.g., over a PC5 interface, DSRC interface, etc.) with vehicles traveling along a road, bridge, or other infrastructure system in order to obtain traffic-related data (e.g., time, speed, location, etc. of the vehicle). In some cases, in response to obtaining the traffic-related data, the RSU may determine or estimate traffic congestion information (e.g., a start of traffic congestion, an end of traffic congestion, etc.), a travel time, and/or other information for a particular location. In some examples, the RSU may communicate with other RSUs (e.g., over a PC5 interface, DSRC interface, etc.) in order to determine the traffic-related data. The RSU may transmit the information (e.g., traffic congestion information, travel time information, and/or other information) to other vehicles, pedestrian UEs, and/or other UEs. For example, the RSU may broadcast or otherwise transmit the information to any UE (e.g., vehicle, pedestrian UE, etc.) that is in a coverage range of the RSU.

According to various aspects, FIG. 1 illustrates an example of a wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a 4G/LTE network, or gNBs where the wireless communications system 100 corresponds to a 5G/NR network, or a combination of both, and the small cell base stations may include femtocells, picocells, microcells, etc.

The base stations 102 may collectively form a radio access network (RAN) and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency may be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 may include devices (e.g., UEs etc.) that communicate with one or more UEs 104, base stations 102, APs 150, etc. utilizing the ultra-wideband (UWB) spectrum. The UWB spectrum may range from 3.1 to 10.5 GHz.

The small cell base station 102' may operate in a licensed and/or an unlicensed frequency spectrum (e.g., utilizing LTE or NR technology and use the same 5 GHz unlicensed frequency spectrum as used by the WLAN AP 150). The wireless communications system 100 may further include a millimeter wave (mmW) base station 180 that may operate in mmW frequencies and/or near mmW frequencies in communication with a UE 182. In some cases, mmW frequencies may be referred to as the FR2 band (e.g., including a frequency range of 24250 MHz to 52600 MHz). In some examples, the wireless communications system 100 may include one or more base stations (referred to herein as "hybrid base stations") that operate in both the mmW frequencies (and/or near mmW frequencies) and in sub-6 GHz frequencies (referred to as the FR1 band, e.g., including a frequency range of 450 to 6000 MHz). In some examples, the mmW base station 180, one or more hybrid base stations (not shown), and the UE 182 may utilize beamforming (transmit and/or receive) over a mmW communication link 184 to compensate for the extremely high path loss and short range. The wireless communications system 100 may further include a UE 164 that may communicate with a macro cell base station 102 over a communication link 120 and/or the mmW base station 180 over a mmW communication link 184.

In some examples, in order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that may be tuned to band (i.e., carrier frequency) 'X' or band 'Y,' and "Receiver 2" is a one-band receiver tunable to band 'Z' only.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, UWB, and so on.

Figure 2A:
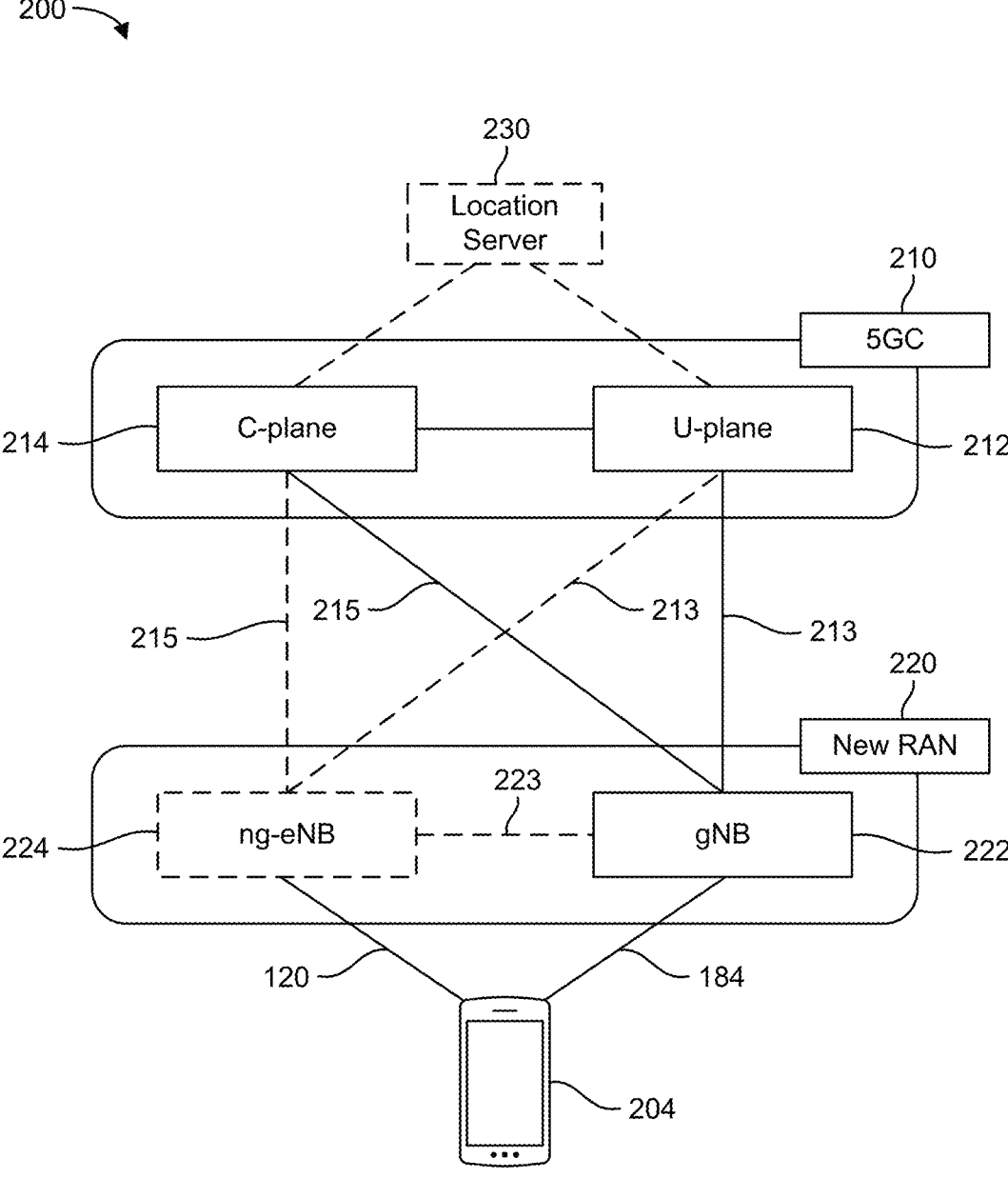
FIG. 2A and FIG. 2B illustrate examples of wireless network structures, according to aspects of the disclosure.

According to various aspects, FIG. 2A illustrates an example wireless network structure 200. For example, a 5GC 210 (also referred to as a Next Generation Core (NGC)) may be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1).

In some aspects, wireless network structure 200 may include location server 230, which may be in communication with the 5GC 210 to provide location assistance for UEs 204. The location server 230 may be implemented as a plurality of separate servers (e.g., physically separate servers, different software modules on a single server, different software modules spread across multiple physical servers, etc.), or alternately may each correspond to a single server. The location server 230 may be configured to support one or more location services for UEs 204 that may connect to the location server 230 via the core network, 5GC 210, and/or via the Internet (not illustrated). Further, the location server 230 may be integrated into a component of the core network, or alternatively may be external to the core network. In some examples, the location server 230 may be operated by a carrier or provider of the 5GC 210, a third party, an original equipment manufacturer (OEM), or other party. In some cases, multiple location servers may be provided, such as a location server for the carrier, a location server for an OEM of a particular device, and/or other location servers. In such cases, location assistance data may be received from the location server of the carrier and other assistance data may be received from the location server of the OEM.

Figure 2B:

According to various aspects, FIG. 2B illustrates another example wireless network structure 250. In some examples, 5GC 260 may be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In some examples, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNB s 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 may include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 may also interact with an authentication server function (AUSF) (not shown) and the UE 204 and may receive an intermediate key established as a result of the UE 204 authentication process.

In the case of authentication based on a UMTS (universal mobile telecommunications system) subscriber identity module (USIM), the AMF 264 may retrieve the security material from the AUSF. The functions of the AMF 264 may also include security context management (SCM). The SCM may receive a key from the SEAF that it may use to derive access-network specific keys. The functionality of the AMF 264 may also include location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 may also support functionalities for non-3GPP access networks.

In some cases, UPF 262 may perform functions that include serving as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink and/or downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. In some aspects, UPF 262 may also support transfer of location services messages over a user plane between the UE 204 and a location server, such as a secure user plane location (SUPL) location platform (SLP), not shown in FIG. 2B.

In some examples, the functions of SMF 266 may include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 may be referred to as the N11 interface.

In some aspects, wireless network structure 250 may include an LMF 270, which may be in communication with the 5GC 260 to provide location assistance for UEs 204. The LMF 270 may be implemented as a plurality of separate servers (e.g., physically separate servers, different software modules on a single server, different software modules spread across multiple physical servers, etc.), or alternately may each correspond to a single server. The LMF 270 may be configured to support one or more location services for UEs 204 that may connect to the LMF 270 via the core network, 5GC 260, and/or via the Internet (not illustrated). The SLP may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP may communicate with UEs 204 and external clients (not shown in FIG. 2B) over a user plane (e.g., using protocols intended to carry voice and/or data like the transmission control protocol (TCP) and/or IP).

In some cases, LMF 270 and/or the SLP may be integrated with a base station, such as the gNB 222 and/or the ng-eNB 224. When integrated with the gNB 222 and/or the ng-eNB 224, the LMF 270 and/or the SLP may be referred to as a "location management component," or "LMC." As used herein, references to LMF 270 and SLP include both the case in which the LMF 270 and the SLP are components of the core network (e.g., 5GC 260) and the case in which the LMF 270 and the SLP are components of a base station.

As described above, wireless communications systems support communication among multiple UEs. In various examples, wireless communications systems may be configured to support device-to-device (D2D) communication and/or vehicle-to-everything (V2X) communication. V2X may also be referred to as Cellular V2X (C-V2X). V2X communications may be performed using any radio access technology, such as LTE, 5G, WLAN, or other communication protocol. In some examples, UEs may transmit and receive V2X messages to and from other UEs, roadside units (RSUs), and/or other devices over a direct communications link or interface (e.g., a PC5 or sidelink interface, an 802.11p DSRC interface, and/or other communications interface) and/or via the network (e.g., an eNB, a WiFi AP, and/or other network entity). The communications may be performed using resources assigned by the network (e.g., an eNB or other network device), resources pre-configured for V2X use, and/or using resources determined by the UEs (e.g., using clear channel assessment (CCA) with respect to resources of an 802.11 network).

V2X communications may include communications between vehicles (e.g., vehicle-to-vehicle (V2V)), communications between vehicles and infrastructure (e.g., vehicle-to-infrastructure (V2I)), communications between vehicles and pedestrians (e.g., vehicle-to-pedestrian (V2P)), and/or communications between vehicles and network severs (vehicle-to-network (V2N)). For V2V, V2P, and V2I communications, data packets may be sent directly (e.g., using a PC5 interface, using an 802.11 DSRC interface, etc.) between vehicles without going through the network, eNB, or gNB. V2X-enabled vehicles, for instance, may use a short-range direct-communication mode that provides 360° non-line-of-sight (NLOS) awareness, complementing onboard line-of-sight (LOS) sensors, such as cameras, radio detection and ranging (RADAR), Light Detection and Ranging (LIDAR), among other sensors. The combination of wireless technology and onboard sensors enables V2X vehicles to visually observe, hear, and/or anticipate potential driving hazards (e.g., at blind intersections, in poor weather conditions, and/or in other scenarios). V2X vehicles may also understand alerts or notifications from other V2X-enabled vehicles (based on V2V communications), from infrastructure systems (based on V2I communications), and from user devices (based on V2P communications). Infrastructure systems may include roads, stop lights, road signs, bridges, toll booths, and/or other infrastructure systems that may communicate with vehicles using V2I messaging.

Depending on the desired implementation, sidelink communications may be performed according to 3GPP communication protocols sidelink (e.g., using a PC5 sidelink interface according to LTE, 5G, etc.), Wi-Fi direct communication protocols (e.g., DSRC protocol), or using any other device-to-device communication protocol. In some examples, sidelink communication may be performed using one or more Unlicensed National Information Infrastructure (U-NII) bands. For instance, sidelink communications may be performed in bands corresponding to the U-NII-4 band (5.850-5.925 GHz), the U-NII-5 band (5.925-6.425 GHz), the U-NII-6 band (6.425-6.525 GHz), the U-NII-7 band (6.525-6.875 GHz), the U-NII-8 band (6.875-7.125 GHz), or any other frequency band that may be suitable for performing sidelink communications.

Figure 3:
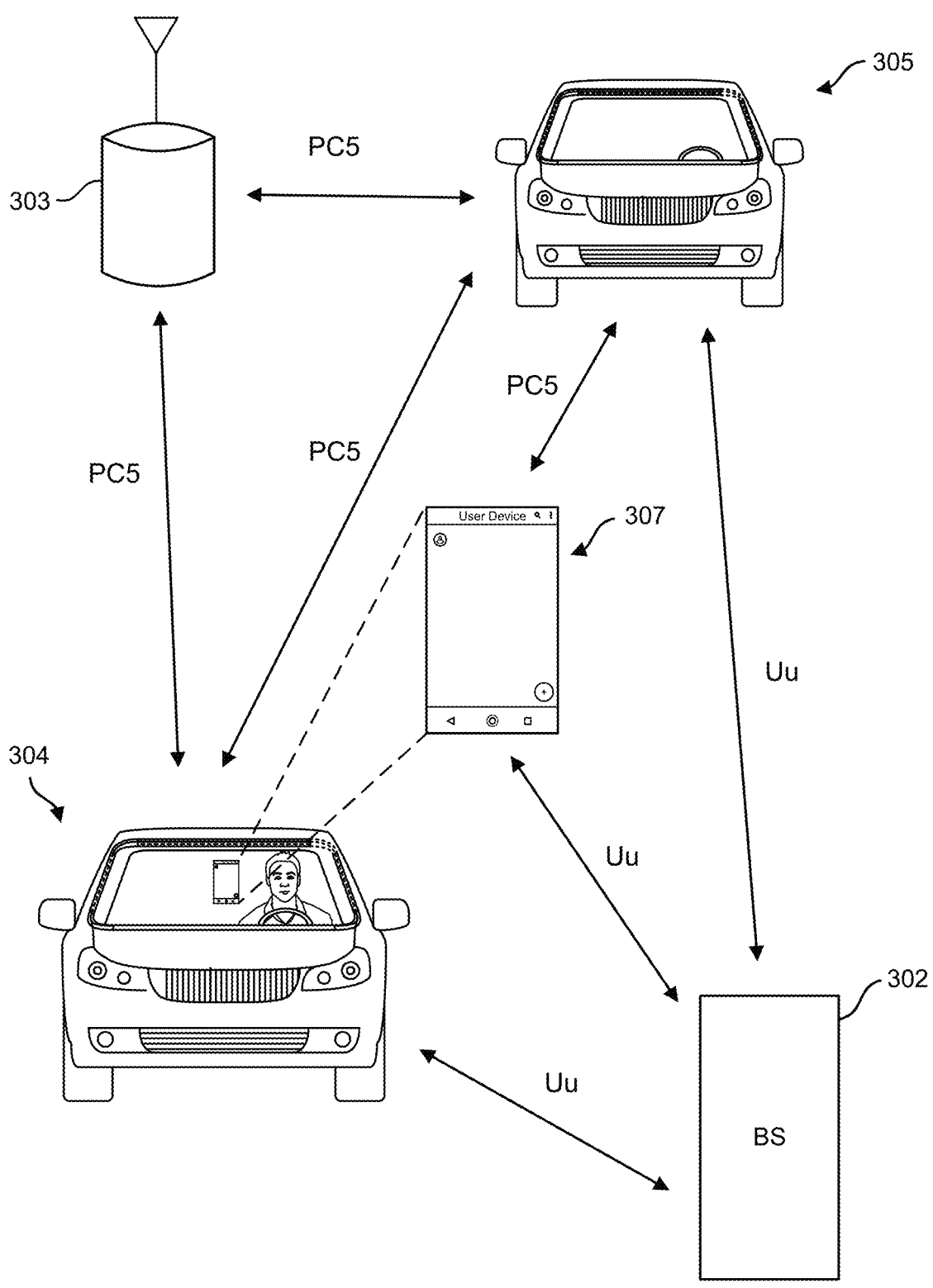
FIG. 3 is a diagram illustrating an example of various user equipment (UEs) communicating over direct communication interfaces (referred to as a PC5 interface or a sidelink interface) and wide area network (Uu) interfaces, according to aspects of the disclosure.

FIG. 3 illustrates examples of different communication mechanisms used by various UEs. In one example, FIG. 3 illustrates a vehicle 304, a vehicle 305, and a roadside unit (RSU) 303 that may communicate with each other using PC5 signaling interfaces. In addition, the vehicle 304 and the vehicle 305 may communicate with a base station 302 (shown as BS 302) using a network (Uu) interface. In some examples, the base station 302 may include a gNB (e.g., base stations 102). FIG. 3 also illustrates a user device 307 communicating with the base station 302 using a network (Uu) interface. In some aspects, functionalities may be transferred from a vehicle (e.g., vehicle 304) to a user device (e.g., user device 307) based on one or more characteristics or factors (e.g., temperature, humidity, etc.). In one illustrative example, V2X functionality may be transitioned from the vehicle 304 to the user device 307, after which the user device 307 may communicate with other vehicles (e.g., vehicle 305) over a PC5 interface, as shown in FIG. 3.

While PC5 interfaces are shown in FIG. 3, the various UEs (e.g., vehicles, user devices, etc.) and RSU(s) may communicate directly using any suitable type of direct interface, such as an 802.11 DSRC interface, a Bluetooth™ interface, and/or other interface. For example, a vehicle may communicate with a user device over a direct communications interface (e.g., using PC5 and/or DSRC), a vehicle may communicate with another vehicle over the direct communications interface, a user device may communicate with another user device over the direct communications interface, a UE (e.g., a vehicle, user device, etc.) may communicate with an RSU over the direct communications interface, an RSU may communicate with another RSU over the direct communications interface, and the like.

Figure 4:
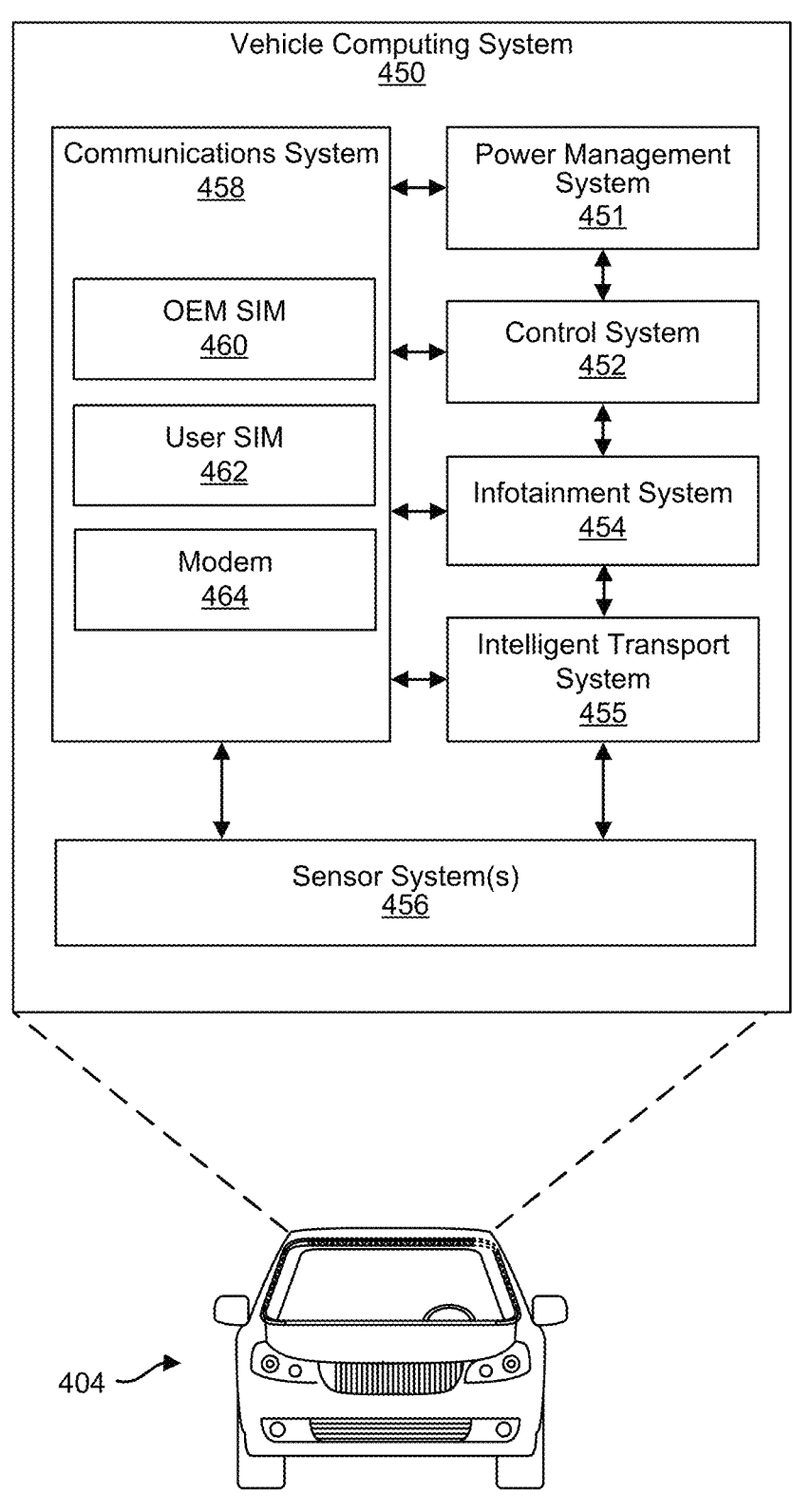
FIG. 4 is a block diagram illustrating an example of a computing system of a vehicle, according to aspects of the disclosure.

FIG. 4 is a block diagram illustrating an example vehicle computing system 450 of a vehicle 404. In some examples, the vehicle computing system 450 may be referred to as an on-board unit (OBU). The vehicle 404 is an example of a UE that may communicate with a network (e.g., an eNB, a gNB, a positioning beacon, a location measurement unit, and/or other network entity) over a Uu interface and with other UEs using V2X communications over a PC5 interface (or another device-to-device direct interface). As shown, the vehicle computing system 450 may include at least a power management system 451, a control system 452, an infotainment system 454, an intelligent transport system (ITS) 455, one or more sensor systems 456, and a communications system 458. In some cases, the vehicle computing system 450 may include or may be implemented using any type of processing device or system, such as one or more central processing units (CPUs), digital signal processors (DSPs), application specific integrated circuits (ASICs), field programmable gate arrays (FPGAs), application processors (APs), graphics processing units (GPUs), vision processing units (VPUs), Neural Network Signal Processors (NSPs), microcontrollers, dedicated hardware, any combination thereof, and/or other processing device or system.

The control system 452 may be configured to control one or more operations of the vehicle 404, the power management system 451, the computing system 450, the infotainment system 454, the ITS 455, and/or one or more other systems of the vehicle 404 (e.g., a braking system, a steering system, a safety system other than the ITS 455, a cabin system, and/or other system). In some examples, the control system 452 may include one or more electronic control units (ECUs). An ECU may control one or more of the electrical systems or subsystems in a vehicle. Examples of specific ECUs that may be included as part of the control system 452 include an engine control module (ECM), a powertrain control module (PCM), a transmission control module (TCM), a brake control module (BCM), a central control module (CCM), a central timing module (CTM), among others. In some cases, the control system 452 may receive sensor signals from the one or more sensor systems 456 and may communicate with other systems of the vehicle computing system 450 to operate the vehicle 404.

The vehicle computing system 450 also includes a power management system 451. In some implementations, the power management system 451 may include a power management integrated circuit (PMIC), a standby battery, and/or other components. In some cases, other systems of the vehicle computing system 450 may include one or more PMICs, batteries, and/or other components. The power management system 451 may perform power management functions for the vehicle 404, such as managing a power supply for the computing system 450 and/or other parts of the vehicle. For example, the power management system 451 may provide a stable power supply in view of power fluctuations, such as based on starting an engine of the vehicle. In another example, the power management system 451 may perform thermal monitoring operations, such as by checking ambient and/or transistor junction temperatures. In another example, the power management system 451 may perform certain functions based on detecting a certain temperature level, such as causing a cooling system (e.g., one or more fans, an air conditioning system, etc.) to cool certain components of the vehicle computing system 450 (e.g., the control system 452, such as one or more ECUs), shutting down certain functionalities of the vehicle computing system 450 (e.g., limiting the infotainment system 454, such as by shutting off one or more displays, disconnecting from a wireless network, etc.), among other functions.

The vehicle computing system 450 further includes a communications system 458. The communications system 458 may include both software and hardware components for transmitting signals to and receiving signals from a network (e.g., a gNB or other network entity over a Uu interface) and/or from other UEs (e.g., to another vehicle or UE over a PC5 interface, WiFi interface, Bluetooth™ interface, and/or other wireless and/or wired interface). For example, the communications system 458 is configured to transmit and receive information wirelessly over any suitable wireless network (e.g., a 3G network, 4G network, 5G network, WiFi network, Bluetooth™ network, and/or other network). The communications system 458 includes various components or devices used to perform the wireless communication functionalities, including an original equipment manufacturer (OEM) subscriber identity module (referred to as a SIM or SIM card) 460, a user SIM 462, and a modem 464. While the vehicle computing system 450 is shown as having two SIMs and one modem, the computing system 450 may have any number of SIMs (e.g., one SIM or more than two SIMs) and any number of modems (e.g., one modem, two modems, or more than two modems) in some implementations.

A SIM is a device (e.g., an integrated circuit) that may securely store an international mobile subscriber identity (IMSI) number and a related key (e.g., an encryption-decryption key) of a particular subscriber or user. The IMSI and key may be used to identify and authenticate the subscriber on a particular UE. The OEM SIM 460 may be used by the communications system 458 for establishing a wireless connection for vehicle-based operations, such as for conducting emergency-calling (eCall) functions, communicating with a communications system of the vehicle manufacturer (e.g., for software updates, etc.), among other operations. The OEM SIM 460 may be used to support one or more services such as eCall for making emergency calls in the event of a car accident or other emergency. For instance, eCall may include a service that automatically dials an emergency number (e.g., "9-1-1" in the United States, "1-1-2" in Europe, etc.) in the event of a vehicle accident and communicates a location of the vehicle to the emergency services, such as a police department, fire department, etc.

The user SIM 462 may be used by the communications system 458 for performing wireless network access functions in order to support a user data connection (e.g., for conducting phone calls, messaging, Infotainment related services, among others). In some cases, a user device of a user may connect with the vehicle computing system 450 over an interface (e.g., over PC5, Bluetooth™, WiFI™, a universal serial bus (USB) port, and/or other wireless or wired interface). Once connected, the user device may transfer wireless network access functionality from the user device to communications system 458 the vehicle, in which case the user device may cease performance of the wireless network access functionality (e.g., during the period in which the communications system 458 is performing the wireless access functionality). The communications system 458 may begin interacting with a base station to perform one or more wireless communication operations, such as facilitating a phone call, transmitting and/or receiving data (e.g., messaging, video, audio, etc.), among other operations. In such cases, other components of the vehicle computing system 450 may be used to output data received by the communications system 458. For example, the infotainment system 454 (described below) may display video received by the communications system 458 on one or more displays and/or may output audio received by the communications system 458 using one or more speakers.

A modem is a device that modulates one or more carrier wave signals to encode digital information for transmission and demodulates signals to decode the transmitted information. The modem 464 (and/or one or more other modems of the communications system 458) may be used for communication of data for the OEM SIM 460 and/or the user SIM 462. In some examples, the modem 464 may include a 4G (or LTE) modem and another modem (not shown) of the communications system 458 may include a 5G (or NR) modem. In some examples, the communications system 458 may include one or more Bluetooth™ modems (e.g., for Bluetooth™ Low Energy (BLE) or other type of Bluetooth communications), one or more WiFi™ modems (e.g., for DSRC communications and/or other WiFi communications), wideband modems (e.g., an ultra-wideband (UWB) modem), any combination thereof, and/or other types of modems.

In some cases, the modem 464 (and/or one or more other modems of the communications system 458) may be used for performing V2X communications (e.g., with other vehicles for V2V communications, with other devices for D2D communications, with infrastructure systems for V2I communications, with pedestrian UEs for V2P communications, etc.). In some examples, the communications system 458 may include a V2X modem used for performing V2X communications (e.g., sidelink communications over a PC5 interface), in which case the V2X modem may be separate from one or more modems used for wireless network access functions (e.g., for network communications over a network/Uu interface and/or sidelink communications other than V2X communications).

In some examples, the communications system 458 may be or may include a telematics control unit (TCU). In some implementations, the TCU may include a network access device (NAD) (also referred to in some cases as a network control unit or NCU). The NAD may include the modem 464, any other modem not shown in FIG. 4, the OEM SIM 460, the user SIM 462, and/or other components used for wireless communications. In some examples, the communications system 458 may include a Global Navigation Satellite System (GNSS). In some cases, the GNSS may be part of the one or more sensor systems 456, as described below. The GNSS may provide the ability for the vehicle computing system 450 to perform one or more location services, navigation services, and/or other services that may utilize GNSS functionality.

In some cases, the communications system 458 may further include one or more wireless interfaces (e.g., including one or more transceivers and one or more baseband processors for each wireless interface) for transmitting and receiving wireless communications, one or more wired interfaces (e.g., a serial interface such as a universal serial bus (USB) input, a lightening connector, and/or other wired interface) for performing communications over one or more hardwired connections, and/or other components that may allow the vehicle 404 to communicate with a network and/or other UEs.

The vehicle computing system 450 may also include an infotainment system 454 that may control content and one or more output devices of the vehicle 404 that may be used to output the content. The infotainment system 454 may also be referred to as an in-vehicle infotainment (IVI) system or an In-car entertainment (ICE) system. The content may include navigation content, media content (e.g., video content, music or other audio content, and/or other media content), among other content. The one or more output devices may include one or more graphical user interfaces, one or more displays, one or more speakers, one or more extended reality devices (e.g., a VR, AR, and/or MR headset), one or more haptic feedback devices (e.g., one or more devices configured to vibrate a seat, steering wheel, and/or other part of the vehicle 404), and/or other output device.

In some examples, the computing system 450 may include the intelligent transport system (ITS) 455. In some examples, the ITS 455 may be used for implementing V2X communications. For example, an ITS stack of the ITS 455 may generate V2X messages based on information from an application layer of the ITS. In some cases, the application layer may determine whether certain conditions have been met for generating messages for use by the ITS 455 and/or for generating messages that are to be sent to other vehicles (for V2V communications), to pedestrian UEs (for V2P communications), and/or to infrastructure systems (for V2I communications). In some cases, the communications system 458 and/or the ITS 455 may obtain car access network (CAN) information (e.g., from other components of the vehicle via a CAN bus). In some examples, the communications system 458 (e.g., a TCU NAD) may obtain the CAN information via the CAN bus and may send the CAN information to the ITS stack. The CAN information may include vehicle related information, such as a heading of the vehicle, speed of the vehicle, breaking information, among other information. The CAN information may be continuously or periodically (e.g., every 1 millisecond (ms), every 10 ms, or the like) provided to the ITS 455.

The conditions used to determine whether to generate messages may be determined using the CAN information based on safety-related applications and/or other applications, including applications related to road safety, traffic efficiency, infotainment, business, and/or other applications. In one illustrative example, ITS 455 may perform lane change assistance or negotiation. For instance, using the CAN information, the ITS 455 may determine that a driver of the vehicle 404 is attempting to change lanes from a current lane to an adjacent lane (e.g., based on a blinker being activated, based on the user veering or steering into an adjacent lane, etc.). Based on determining the vehicle 404 is attempting to change lanes, the ITS 455 may determine a lane-change condition has been met that is associated with a message to be sent to other vehicles that are nearby the vehicle in the adjacent lane. The ITS 455 may trigger the ITS stack to generate one or more messages for transmission to the other vehicles, which may be used to negotiate a lane change with the other vehicles. Other examples of applications include forward collision warning, automatic emergency breaking, lane departure warning, pedestrian avoidance or protection (e.g., when a pedestrian is detected near the vehicle 404, such as based on V2P communications with a UE of the user), traffic sign recognition, among others.

The ITS 455 may use any suitable protocol to generate messages (e.g., V2X messages). Examples of protocols that may be used by the ITS 455 include one or more Society of Automotive Engineering (SAE) standards, such as SAE J2735, SAE J2945, SAE J3161, and/or other standards, which are hereby incorporated by reference in their entirety and for all purposes.

A security layer of the ITS 455 may be used to securely sign messages from the ITS stack that are sent to and verified by other UEs configured for V2X communications, such as other vehicles, pedestrian UEs, and/or infrastructure systems. The security layer may also verify messages received from such other UEs. In some implementations, the signing and verification processes may be based on a security context of the vehicle. In some examples, the security context may include one or more encryption-decryption algorithms, a public and/or private key used to generate a signature using an encryption-decryption algorithm, and/or other information. For example, each ITS message generated by the ITS stack may be signed by the security layer. The signature may be derived using a public key and an encryption-decryption algorithm. A vehicle, pedestrian UE, and/or infrastructure system receiving a signed message may verify the signature to make sure the message is from an authorized vehicle. In some examples, the one or more encryption-decryption algorithms may include one or more symmetric encryption algorithms (e.g., advanced encryption standard (AES), data encryption standard (DES), and/or other symmetric encryption algorithm), one or more asymmetric encryption algorithms using public and private keys (e.g., Rivest-Shamir-Adleman (RSA) and/or other asymmetric encryption algorithm), and/or other encryption-decryption algorithm.

In some examples, the ITS 455 may determine certain operations (e.g., V2X-based operations) to perform based on messages received from other UEs. The operations may include safety-related and/or other operations, such as operations for road safety, traffic efficiency, infotainment, business, and/or other applications. In some examples, the operations may include causing the vehicle (e.g., the control system 452) to perform automatic functions, such as automatic breaking, automatic steering (e.g., to maintain a heading in a particular lane), automatic lane change negotiation with other vehicles, among other automatic functions. In one illustrative example, a message may be received by the communications system 458 from another vehicle (e.g., over a PC5 interface) indicating that the other vehicle is coming to a sudden stop. In response to receiving the message, the ITS 455 may generate a message or instruction and may send the message or instruction to the control system 452, which may cause the control system 452 to automatically break the vehicle 404 so that it comes to a stop before making impact with the other vehicle. In other illustrative examples, the operations may include triggering display of a message alerting a driver that another vehicle is in the lane next to the vehicle, a message alerting the driver to stop the vehicle, a message alerting the driver that a pedestrian is in an upcoming cross-walk, a message alerting the driver that a toll booth is within a certain distance (e.g., within 1 mile) of the vehicle, among others.

The computing system 450 further includes one or more sensor systems 456 (e.g., a first sensor system through an Nth sensor system, where N is a value equal to or greater than 0). When including multiple sensor systems, the sensor system(s) 456 may include different types of sensor systems that may be arranged on or in different parts the vehicle 404. The sensor system(s) 456 may include one or more camera sensor systems, Light Detection and Ranging (LIDAR) sensor systems, radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems (e.g., one or more Global Positioning System (GPS) receiver systems), accelerometers, gyroscopes, inertial measurement units (IMUs), infrared sensor systems, laser rangefinder systems, ultrasonic sensor systems, infrasonic sensor systems, microphones, any combination thereof, and/or other sensor systems. It should be understood that any number of sensors or sensor systems may be included as part of the computing system 450 of the vehicle 404.

While the vehicle computing system 450 is shown to include certain components and/or systems, one of ordinary skill will appreciate that the vehicle computing system 450 may include more or fewer components than those shown in FIG. 4. For example, the vehicle computing system 450 may also include one or more input devices and one or more output devices (not shown). In some implementations, the vehicle computing system 450 may also include (e.g., as part of or separate from the control system 452, the infotainment system 454, the communications system 458, and/or the sensor system(s) 456) at least one processor and at least one memory having computer-executable instructions that are executed by the at least one processor. The at least one processor is in communication with and/or electrically connected to (referred to as being "coupled to" or "communicatively coupled") the at least one memory. The at least one processor may include, for example, one or more microcontrollers, one or more central processing units (CPUs), one or more field programmable gate arrays (FPGAs), one or more graphics processing units (GPUs), one or more application processors (e.g., for running or executing one or more software applications), and/or other processors. The at least one memory may include, for example, read-only memory (ROM), random access memory (RAM) (e.g., static RAM (SRAM)), electrically erasable programmable read-only memory (EEPROM), flash memory, one or more buffers, one or more databases, and/or other memory. The computer-executable instructions stored in or on the at least memory may be executed to perform one or more of the functions or operations described herein.

Figure 5:
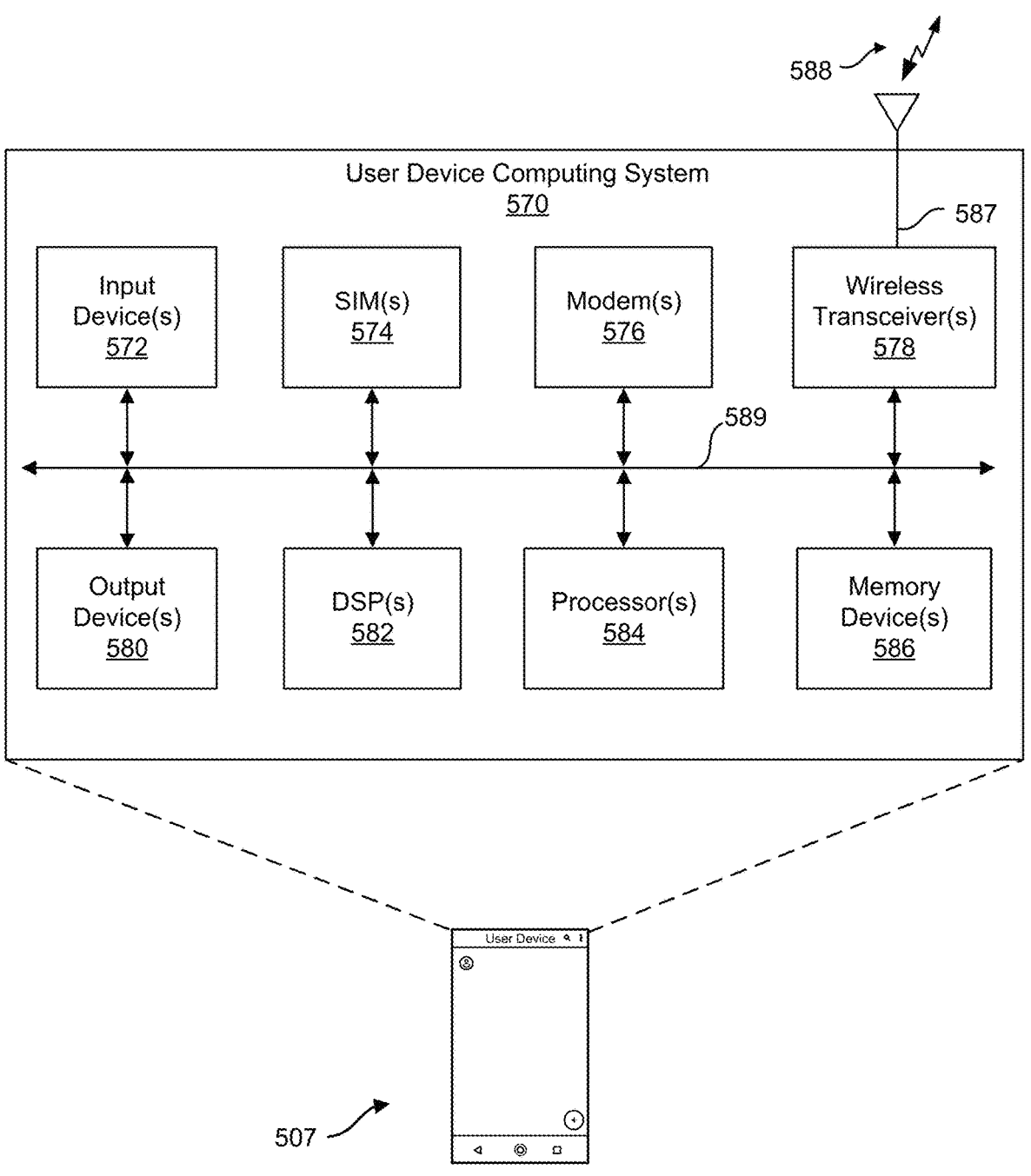
FIG. 5 is a block diagram illustrating an example of a computing system of a user device, according to aspects of the disclosure.

FIG. 5 illustrates an example of a computing system 570 of a wireless device 507. The wireless device 507 may include a client device such as a UE (e.g., UE 104, WLAN STA 152, UE 190) or other type of device (e.g., a station (STA) configured to communication using a Wi-Fi interface) that may be used by an end-user. Wireless device may also include network devices (e.g., base stations such as eNBs and/or gNBs, Wi-Fi access points (APs) such as routers, range extenders or the like, etc.). For example, the wireless device 507 may include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, base station, access point, and/or another device that is configured to communicate over a wireless communications network. The computing system 570 includes software and hardware components that may be electrically or communicatively coupled via a bus 589 (or may otherwise be in communication, as appropriate). For example, the computing system 570 includes one or more processors 584. The one or more processors 584 may include one or more CPUs, ASICs, FPGAs, APs, GPUs, VPUs, NSPs, microcontrollers, dedicated hardware, any combination thereof, and/or other processing device or system. The bus 589 may be used by the one or more processors 584 to communicate between cores and/or with the one or more memory devices 586.

The computing system 570 may also include one or more memory devices 586, one or more digital signal processors (DSPs) 582, one or more SIMs 574, one or more modems 576, one or more wireless transceivers 578, an antenna 587, one or more input devices 572 (e.g., a camera, a mouse, a keyboard, a touch sensitive screen, a touch pad, a keypad, a microphone, and/or the like), and one or more output devices 580 (e.g., a display, a speaker, a printer, and/or the like).

In some aspects, computing system 570 may include one or more radio frequency (RF) interfaces configured to transmit and/or receive RF signals. In some examples, an RF interface may include components such as modem(s) 576, wireless transceiver(s) 578, and/or antennas 587. The one or more wireless transceivers 578 may transmit and receive wireless signals (e.g., signal 588) via antenna 587 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 570 may include multiple antennas or an antenna array that may facilitate simultaneous transmit and receive functionality. Antenna 587 may be an omnidirectional antenna such that radio frequency (RF) signals may be received from and transmitted in all directions. The wireless signal 588 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 588 may be transmitted directly to other wireless devices using sidelink communications (e.g., using a PC5 interface, using a DSRC interface, etc.). Wireless transceivers 578 may be configured to transmit RF signals for performing sidelink communications via antenna 587 in accordance with one or more transmit power parameters that may be associated with one or more regulation modes. Wireless transceivers 578 may also be configured to receive sidelink communication signals having different signal parameters from other wireless devices.

In some examples, the one or more wireless transceivers 578 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end may generally handle selection and conversion of the wireless signals 588 into a baseband or intermediate frequency and may convert the RF signals to the digital domain.

In some cases, the computing system 570 may include a coding-decoding device (or CODEC) configured to encode and/or decode data transmitted and/or received using the one or more wireless transceivers 578. In some cases, the computing system 570 may include an encryption-decryption device or component configured to encrypt and/or decrypt data (e.g., according to the AES and/or DES standard) transmitted and/or received by the one or more wireless transceivers 578.

The one or more SIMs 574 may each securely store an international mobile subscriber identity (IMSI) number and related key assigned to the user of the wireless device 507. The IMSI and key may be used to identify and authenticate the subscriber when accessing a network provided by a network service provider or operator associated with the one or more SIMs 574. The one or more modems 576 may modulate one or more signals to encode information for transmission using the one or more wireless transceivers 578. The one or more modems 576 may also demodulate signals received by the one or more wireless transceivers 578 in order to decode the transmitted information. In some examples, the one or more modems 576 may include a Wi-Fi modem, a 4G (or LTE) modem, a 5G (or NR) modem, and/or other types of modems. The one or more modems 576 and the one or more wireless transceivers 578 may be used for communicating data for the one or more SIMs 574.

The computing system 570 may also include (and/or be in communication with) one or more non-transitory machine-readable storage media or storage devices (e.g., one or more memory devices 586), which may include, without limitation, local and/or network accessible storage, a disk drive, a drive array, an optical storage device, a solid-state storage device such as a RAM and/or a ROM, which may be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 586 and executed by the one or more processor(s) 584 and/or the one or more DSPs 582. The computing system 570 may also include software elements (e.g., located within the one or more memory devices 586), including, for example, an operating system, device drivers, executable libraries, and/or other code, such as one or more application programs, which may comprise computer programs implementing the functions provided by various embodiments, and/or may be designed to implement methods and/or configure systems, as described herein.

In some aspects, the wireless device 507 may include means for performing operations described herein. The means may include one or more of the components of the computing system 570. For example, the means for performing operations described herein may include one or more of input device(s) 572, SIM(s) 574, modem(s) 576, wireless transceiver(s) 578, output device(s) (580), DSP(s) 582, processors (584), memory device(s) 586, and/or antenna(s) 587.

In some aspects, wireless device 507 may correspond to a user equipment (UE) and may include: means for providing security for broadcast and/or groupcast sidelink positioning. In some examples, the means for generating, at a user equipment (UE), a message including information associated with positioning-reference signaling may include the one or more processors 584, the one or more DSPs 582, the one or more wireless transceivers 578, the one or more modems 576, the one or more memory devices 586, the one or more wireless transceivers 578, the one or more modems 576, the one or more SIMs 574, any combination thereof, or other component(s) of the wireless device. In the present disclosure, the term "positioning-reference signaling" may refer to exchanging of signals and/or messages to aid in position determination. In some examples, the means for obtaining a group identifier indicative of a group to which the UE belongs may include the one or more processors 584, the one or more DSPs 582, the one or more wireless transceivers 578, the one or more modems 576, the one or more memory devices 586, the one or more wireless transceivers 578, the one or more modems 576, the one or more SIMs 574, any combination thereof, or other component(s) of the wireless device. In some examples, the means for obtaining a group key and a group-key identifier associated with the group key may include the one or more processors 584, the one or more DSPs 582, the one or more wireless transceivers 578, the one or more modems 576, the one or more memory devices 586, the one or more wireless transceivers 578, the one or more modems 576, the one or more SIMs 574, any combination thereof, or other component(s) of the wireless device. In the present disclosure, the term "group-key identifier" may refer to an identifier (e.g., a code or number) that may be associated with and/or used to identify a group key. In some examples, the means for obtaining a UE identifier indicative of the UE may include the one or more processors 584, the one or more DSPs 582, the one or more wireless transceivers 578, the one or more modems 576, the one or more memory devices 586, the one or more wireless transceivers 578, the one or more modems 576, the one or more SIMs 574, any combination thereof, or other component(s) of the wireless device. In the present disclosure, the term "UE identifier" may refer to an identifier (e.g., a code or number) that may be associated with and/or used to identify a UE. In some examples, the means for deriving a traffic key based on the group key, the group identifier, and the UE identifier may include the one or more processors 584, the one or more DSPs 582, the one or more wireless transceivers 578, the one or more modems 576, the one or more memory devices 586, the one or more wireless transceivers 578, the one or more modems 576, the one or more SIMs 574, any combination thereof, or other component(s) of the wireless device. In the present disclosure, the term "traffic key" may be used to refer to a cryptographic key that may be used according to various aspects of the present disclosure to secure messages. In some examples, the means for deriving an encryption key and an integrity key based on the traffic key may include the one or more processors 584, the one or more DSPs 582, the one or more wireless transceivers 578, the one or more modems 576, the one or more memory devices 586, the one or more wireless transceivers 578, the one or more modems 576, the one or more SIMs 574, any combination thereof, or other component(s) of the wireless device. In some examples, the means for generating a message header for the message, the message header comprising the group identifier and the group-key identifier may include the one or more processors 584, the one or more DSPs 582, the one or more wireless transceivers 578, the one or more modems 576, the one or more memory devices 586, the one or more wireless transceivers 578, the one or more modems 576, the one or more SIMs 574, any combination thereof, or other component(s) of the wireless device. In some examples, the means for calculating a message-authentication code (MAC) using the integrity key, the message, and the message header may include the one or more processors 584, the one or more DSPs 582, the one or more wireless transceivers 578, the one or more modems 576, the one or more memory devices 586, the one or more wireless transceivers 578, the one or more modems 576, the one or more SIMs 574, any combination thereof, or other component(s) of the wireless device. In some examples, the means for encrypting the message using the encryption key to generate an encrypted message may include the one or more processors 584, the one or more DSPs 582, the one or more wireless transceivers 578, the one or more modems 576, the one or more memory devices 586, the one or more wireless transceivers 578, the one or more modems 576, the one or more SIMs 574, any combination thereof, or other component(s) of the wireless device. In some examples, the means for encrypting the MAC using the encryption key to generate an encrypted MAC may include the one or more processors 584, the one or more DSPs 582, the one or more wireless transceivers 578, the one or more modems 576, the one or more memory devices 586, the one or more wireless transceivers 578, the one or more modems 576, the one or more SIMs 574, any combination thereof, or other component(s) of the wireless device. In some examples, the means for transmitting the message header, the encrypted message, and the encrypted MAC may include the one or more processors 584, the one or more DSPs 582, the one or more wireless transceivers 578, the one or more modems 576, the one or more memory devices 586, the one or more wireless transceivers 578, the one or more modems 576, the one or more SIMs 574, any combination thereof, or other component(s) of the wireless device.

In some examples, the means for receiving, at a first user equipment (UE) from a second UE, a packet including an encrypted message including information associated with positioning-reference signaling, an encrypted message-authentication code (MAC), and a message header, the message header comprising: a group identifier indicative of a group to which the second UE belongs, and a group-key identifier indicative of a group key may include the one or more processors 584, the one or more DSPs 582, the one or more wireless transceivers 578, the one or more modems 576, the one or more memory devices 586, the one or more wireless transceivers 578, the one or more modems 576, the one or more SIMs 574, any combination thereof, or other component(s) of the wireless device. In some examples, the means for obtaining a group identifier indicative that the first UE also belongs to the group to which the second UE belongs may include the one or more processors 584, the one or more DSPs 582, the one or more wireless transceivers 578, the one or more modems 576, the one or more memory devices 586, the one or more wireless transceivers 578, the one or more modems 576, the one or more SIMs 574, any combination thereof, or other component(s) of the wireless device. In some examples, the means for obtaining the group key and the group-key identifier may include the one or more processors 584, the one or more DSPs 582, the one or more wireless transceivers 578, the one or more modems 576, the one or more memory devices 586, the one or more wireless transceivers 578, the one or more modems 576, the one or more SIMs 574, any combination thereof, or other component(s) of the wireless device. In some examples, the means for deriving a traffic key based on the group key may include the one or more processors 584, the one or more DSPs 582, the one or more wireless transceivers 578, the one or more modems 576, the one or more memory devices 586, the one or more wireless transceivers 578, the one or more modems 576, the one or more SIMs 574, any combination thereof, or other component(s) of the wireless device. In some examples, the means for deriving an encryption key and an integrity key based on the traffic key may include the one or more processors 584, the one or more DSPs 582, the one or more wireless transceivers 578, the one or more modems 576, the one or more memory devices 586, the one or more wireless transceivers 578, the one or more modems 576, the one or more SIMs 574, any combination thereof, or other component(s) of the wireless device. In some examples, the means for decrypting the encrypted message and the encrypted MAC using the encryption key to generate a decrypted message and a decrypted MAC may include the one or more processors 584, the one or more DSPs 582, the one or more wireless transceivers 578, the one or more modems 576, the one or more memory devices 586, the one or more wireless transceivers 578, the one or more modems 576, the one or more SIMs 574, any combination thereof, or other component(s) of the wireless device. In some examples, the means for calculating an expected MAC based on the integrity key may include the one or more processors 584, the one or more DSPs 582, the one or more wireless transceivers 578, the one or more modems 576, the one or more memory devices 586, the one or more wireless transceivers 578, the one or more modems 576, the one or more SIMs 574, any combination thereof, or other component(s) of the wireless device. In some examples, the means for verifying integrity of the message by comparing the decrypted MAC with the expected MAC may include the one or more processors 584, the one or more DSPs 582, the one or more wireless transceivers 578, the one or more modems 576, the one or more memory devices 586, the one or more wireless transceivers 578, the one or more modems 576, the one or more SIMs 574, any combination thereof, or other component(s) of the wireless device.

Figure 6:
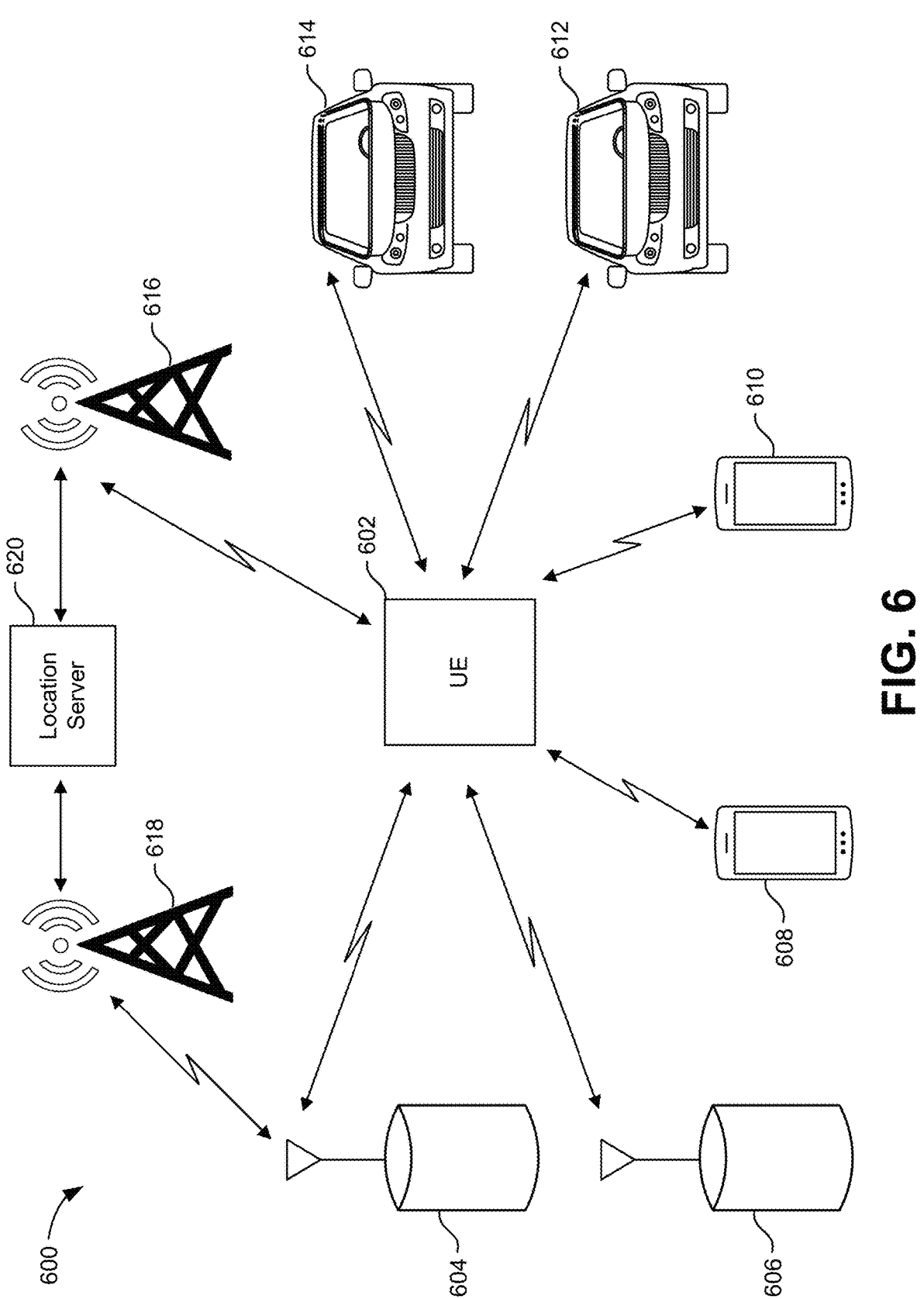
FIG. 6 is a diagram illustrating an example wireless communications system for providing security for sidelink positioning, according to aspects of the disclosure.

As noted previously, systems and techniques are described herein for providing security for sidelink positioning. FIG. 6 is a diagram illustrating an example wireless communications system 600 for providing security for sidelink positioning. In some aspects, the system 600 may include a user equipment (UE) device such as UE 602. The UE 602 may include a vehicle (e.g., automobile, motorcycle, bicycle, etc.), a wireless communication device such as a mobile phone, router, tablet computer, laptop computer, tracking device, wearable device (e.g., smart watch, glasses, an extended reality (XR) device such as a virtual reality (VR) headset, an augmented reality (AR) headset or glasses, or a mixed reality (MR) headset, etc.), an Internet of Things (IoT) device, etc., or other device capable of communicating over a wireless communications network.

In some examples, system 600 may include one or more additional user equipment devices. For instance, system 600 may include one or more roadside units (e.g., RSU 604, RSU 606, etc.), one or more pedestrian UE devices (e.g., pedestrian UE 608, pedestrian UE 610, etc.), and one or more vehicles (e.g., vehicle 612, vehicle 614, etc.). In some configurations, UE 602 may communicate with one or more of RSU 604, RSU 606, pedestrian UE 608, pedestrian UE 610, vehicle 612, and/or vehicle 614 using sidelink communications (e.g., PC5, DSRC, etc.). In some configurations, system 600 may also include a base station 616 that may be associated with UE 602 (e.g., UE 602 may communicate with base station 616 using a network (Uu) interface). In some cases, system 600 may also include base station 618 that may be associated with RSU 604. In some aspects, system 600 may include a location server 620 that may be coupled to or separate from base station 616 and/or base station 618.

In some aspects, one or more of RSU 604, RSU 606, pedestrian UE 608, pedestrian UE 610, vehicle 612, and/or vehicle 614 may be configured to participate in sidelink positioning (e.g., by sending, receiving, and/or responding to positioning-assistance messages and/or PRS messages). In some cases, UE 602 may use sidelink communications to communicate with one or more devices (e.g., RSU 604, RSU 606, pedestrian UE 608, pedestrian UE 610, vehicle 612, and/or vehicle 614) to implement one or more sidelink positioning algorithms (e.g., determine a relative position or an absolute position of UE 602).

In an illustrative example, UE 602 may determine distances between UE 602 and two or more devices (e.g., RSU 604, RSU 606, pedestrian UE 608, pedestrian UE 610, vehicle 612, and/or vehicle 614) via sidelink communications (e.g., based on PRS signals). UE 602 may determine its relative position (e.g., relative to the two or more devices, such as RSU 604, RSU 606, pedestrian UE 608, pedestrian UE 610, vehicle 612, and/or vehicle 614) through multilateration, triangulation, or other positioning technique based on the determine distances. Additionally or alternatively, UE 602 may determine its absolute position by obtaining location data associated with the two or more devices (e.g., RSU 604, RSU 606, pedestrian UE 608, pedestrian UE 610, vehicle 612, and/or vehicle 614) via sidelink communications and revising the relative position based on location data.

In another illustrative example, UE 602 may correspond to a vehicle that may obtain multiple measurements of a PRS signal from a single device while the vehicle is in motion. In some aspects, the vehicle (e.g., UE 602) may include one or more sensors (e.g., sensor system 456) that may be used to obtain measurements or data related to distance, speed, orientation, and/or any other type of measurement that may be obtained using sensor system 456. In some examples, data from sensors (e.g., sensor system 456) may be used by UE 602 to determine the distance traveled between measurements of a PRS signal from a device (e.g., RSU 604, RSU 606, pedestrian UE 608, pedestrian UE 610, vehicle 612, and/or vehicle 614) in order to determine a relative and/or an absolute position of UE 602 using the PRS signals from one or more devices (e.g., using a multilateration-based technique). Those skilled in the art will understand that the number of devices set forth herein are provided as example configurations and that the disclosed systems and techniques are not limited thereto.

In some cases, sidelink positioning may be, or may include a ranging technique between a number of devices (e.g., N devices, such as N UEs, where N is an integer value equal to or greater than 2) based on PRS round-trip time (RTT) measurements. For example, each device can report an RTT measured to all other participating devices (e.g., UEs), along with its location (if known). For devices having limited or inaccurate knowledge of their position, the RTT yields an inter-device range. If one or more of the devices (e.g., RSU 604 or RSU 606) have accurate knowledge of their respective positions (e.g., stored in a respective memory of the one or more devices), the ranges can yield an absolute position for others of the devices.

System 600 (including UE 602, RSU 604, RSU 606, pedestrian UE 608, pedestrian UE 610, vehicle 612, and/or vehicle 614) may implement a security scheme to provide security to the positioning-assistance messages and/or PRS signals. For example, system 600 (including one or more of UE 602, RSU 604, RSU 606, pedestrian UE 608, pedestrian UE 610, vehicle 612, and/or vehicle 614) can encrypt content of positioning-assistance messages and or PRS messages to prevent unintended recipients from accessing the content. Additionally or alternatively, system 600 (including one or more of UE 602, RSU 604, RSU 606, pedestrian UE 608, pedestrian UE 610, vehicle 612, and/or vehicle 614) can authenticate content of positioning-assistance messages and/or PRS messages (e.g., to prevent spoofing of the positioning-assistance messages and/or PRS messages).

Figure 7:
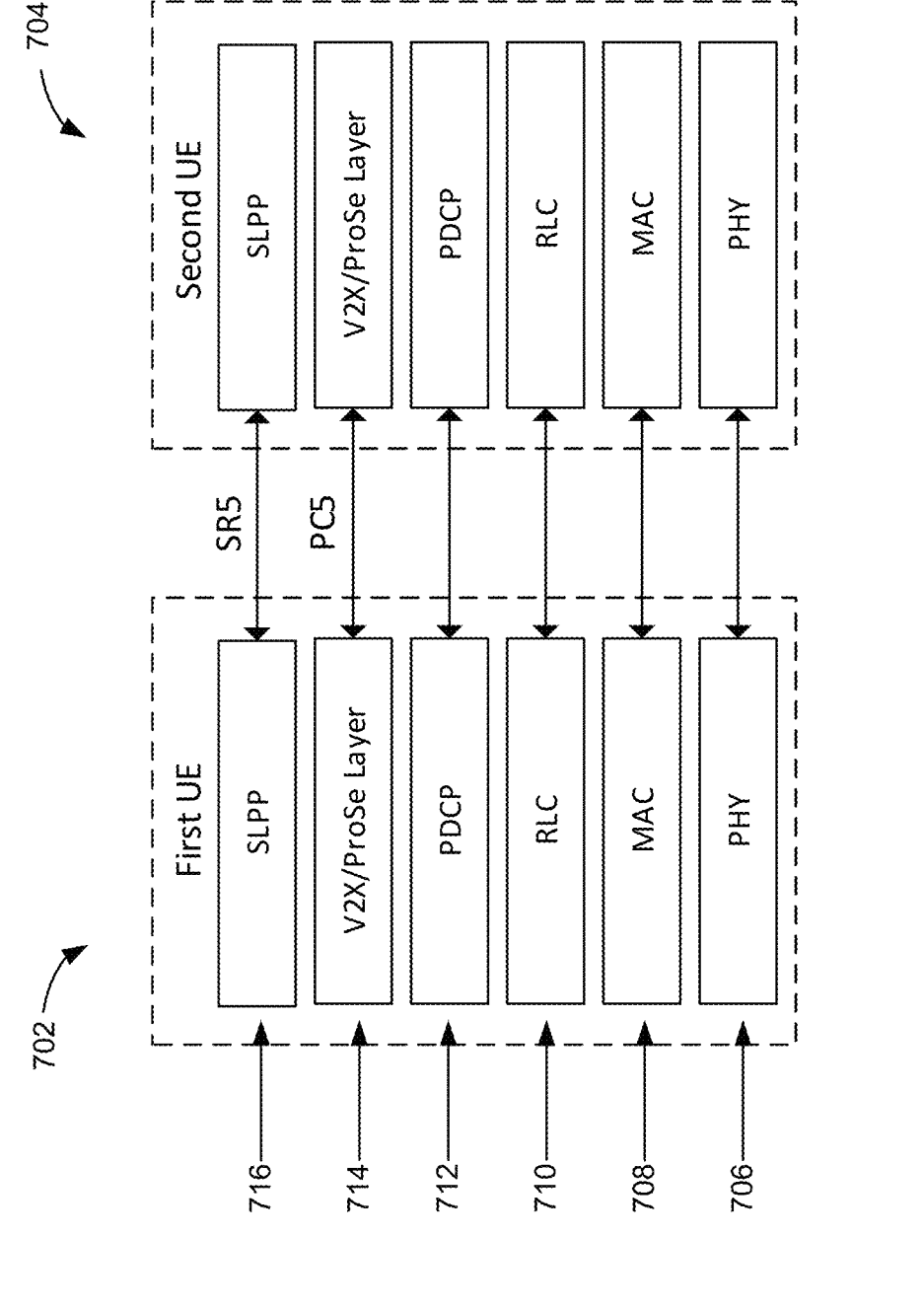
FIG. 7 is a diagram illustrating various layers of a communication model, according to aspects of the disclosure.

FIG. 7 is a diagram illustrating various layers of a communication model 700. Communication model 700 includes a first UE 702 and a second UE 704. First UE 702 and second UE 704 are illustrated as communicating using various layers including a PHY layer 706, a media access control layer 708, an RLC layer 710, a PDCP layer 712, a V2X/ProSe layer 714, and an SLPP layer 716.

For SL positioning (e.g., positioning based on sidelink communications), participating UEs (e.g., including first UE 702 and second UE 704) can exchange messages including positioning capability of the participating UEs, assistant data of the participating UEs, and measurement results of the participating UEs in the SLPP layer 716. The SLPP layer 716 may be implemented on top of the V2X/ProSe layer 714. Because multiple UEs (e.g., in addition to first UE 702 and second UE 704, which are provided as examples) may participate in a session, the messages can be exchanged using groupcast (a function that may be supported by the V2X/ProSe layer 714). As previously described, systems and techniques are described herein for providing security for positioning-assistance messages (e.g., at the SLPP layer 716). For example, systems and techniques, may include encryption and authentication at the SLPP layer 716.

Figure 8:
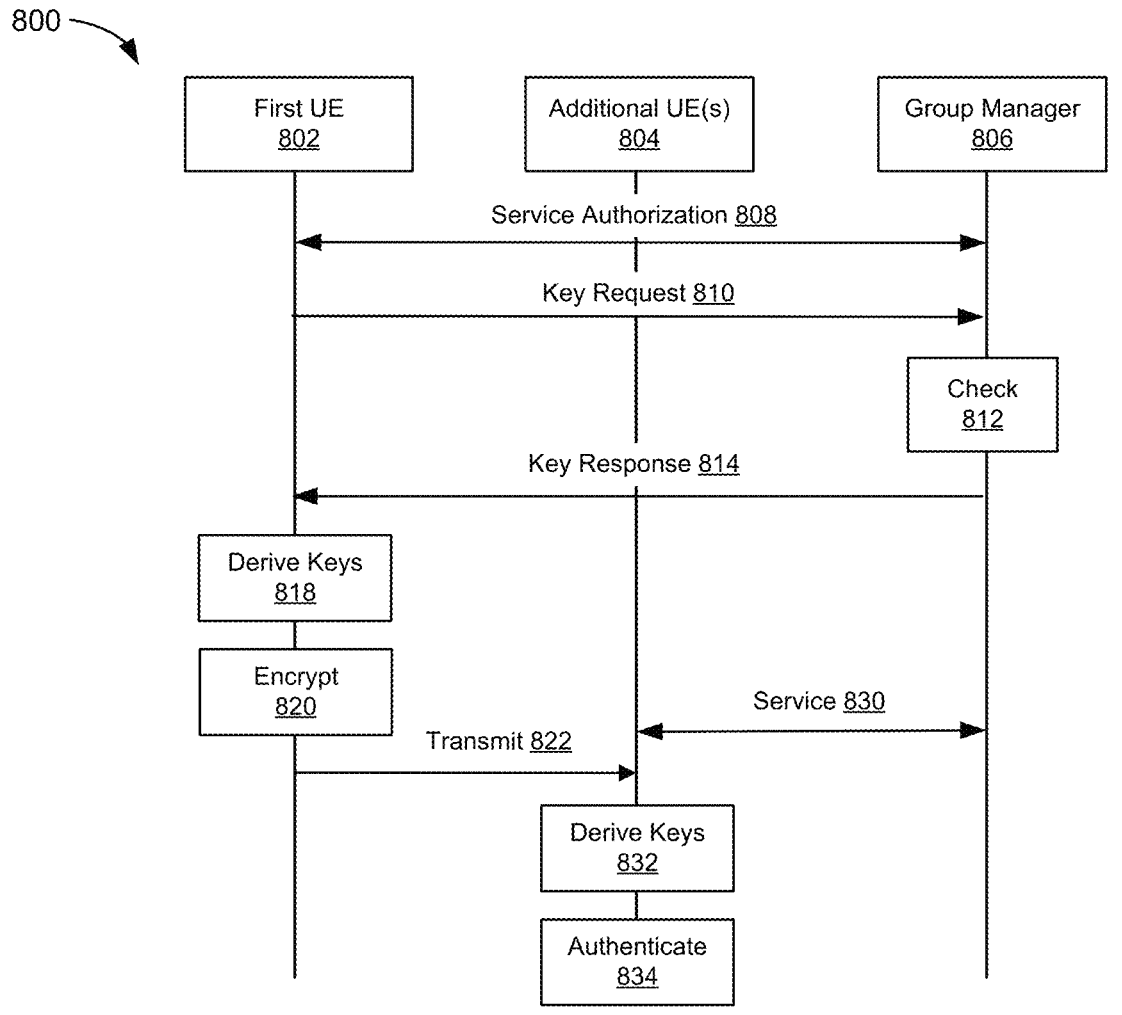
FIG. 8 is a sequence diagram illustrating another example of a sequence for providing security for sidelink positioning, according to aspects of the disclosure.

FIG. 8 is a sequence diagram illustrating an example of a sequence 800 for providing security (e.g., broadcast and/or groupcast security) for sidelink positioning. The sequence 800 may be performed by a first UE 802, one or more additional UEs 804 (which may be referred to alternatively as UEs 804), and group manager 806.

First UE 802 may be, or may include a vehicle (e.g., automobile, motorcycle, bicycle, etc.), a wireless communication device (e.g., a mobile phone, router, tablet computer, laptop computer, tracking device, wearable device such as a smart watch, glasses, an extended reality (XR) device such as a virtual reality (VR) headset, an augmented reality (AR) headset or glasses, or a mixed reality (MR) headset, etc.), Internet of Things (IoT) device, etc., or other device capable of communicating over a wireless communications network. UEs 804 may be, or may include one or more vehicles, one or more wireless communication devices, one or more IoT devices, one or more roadside units, one or more pedestrian UE devices, etc.

Group manager 806 may be, or may include, a computing device capable of communicating with first UE 802 and UEs 804, either directly or indirectly. Group manager 806 may be, or may include, a group management network entity a key management network entity, and/or a group and key management network entity. In the present disclosure, the term "group management network entity" may refer to a computing device that may manage aspects of communications within a network. For example, a group management network entity may generate and/or provide cryptographic keys for securing communication within a network to various devices of the network. A Sidelink Positioning Key Management Function (SLPKMF) is an example of a key management network entity. In some cases, group manager

806 may be at, or part of, a base station (e.g., at one of base stations 102). Additionally or alternatively, group manager 806 may be at, part of, or accessible through, core network 170. Group manager 806 may implement a key management function (KMF). Alternatively, group manager 806 may receive information from a KMF which may be collocated with group manager 806 or may be remote from group manager 806.

First UE 802 may perform service authorization 808 with group manager 806. During the service authorization 808, group manager 806 may authorize first UE 802 to participate in sidelink positioning. For example, first UE 802 may send a service request to group manager 806. Group manager 806 may respond with an acceptance or authorization authorizing first UE 802 to use the sidelink positioning service.

Following service authorization 808, first UE 802 may send a key request 810 to group manager 806. Key request 810 may include a group identifier (which may alternatively be referred to herein as a "group ID") of first UE 802. In some cases, first UE 802 may be pre-configured with the group identifier. In other cases, group manager 806 may provide the group identifier to first UE 802, e.g., as part of service authorization 808. The group identifier may identify a group to which first UE 802 belongs. The group identifier may indicate that first UE 802 is capable of performing sidelink positioning and/or capable of participating with UEs 804 in their sidelink positioning. Key request 810 may additionally include information regarding security capabilities of first UE 802. For example, key request 810 may include information regarding algorithms (e.g., encryption algorithms and/or integrity algorithms) that first UE 802 is capable of performing. In the present disclosure, the term "integrity algorithms" may refer to one or more algorithms (e.g., cryptographic functions) that may be used to generate information (e.g., keys) that may be used to verify integrity of messages.

After receiving key request 810, group manager 806 may check supported security capabilities of first UE 802 at check 812. For example, group manager 806 may verify that first UE 802 is capable of performing sufficient and/or approved algorithms (including encryption and/or integrity algorithms).

If group manager 806 approves first UE 802 at check 812, group manager 806 may provide first UE 802 with security materials in a key response 814. The security materials may include: a sidelink-positioning group key (which may be referred to herein as a "group key"), a sidelink-positioning group-key identifier (which may be referred to herein as "group-key identifier" or "group-key ID"), and one or more algorithm identifiers (which may be referred to herein as "algorithm IDs"). The group-key identifier may correspond to and/or identify the group key. Each of the algorithm identifiers may identify an algorithm (e.g., an encryption algorithm or an integrity algorithm) to be used by first UE 802.

In some cases, such as to support sidelink positioning even if first UE 802 is out of coverage (e.g., out of communication with a base station), group manager 806 may provide first UE 802 with multiple sets of security materials (including multiple group keys and corresponding group-key identifiers) and corresponding validity times. Each of the sets of security materials may be valid during a specific time window as indicated by the validity times. For example, if first UE 802 is capable of sidelink communications with UEs 804, yet out of communication with a base station, first UE 802 may still perform sidelink positioning by using the appropriate group keys and group-key identifiers during the times as indicated by the validity times.

In some cases, the security materials may include a UE identifier. The UE identifier may identify first UE 802. In other cases, first UE 802 may select its own UE identifier. In some such cases, first UE 802 may randomly select the UE identifier. In other cases, first UE 802 may select another identifier associated with first UE 802 (e.g., an identifier used by a lower layer, such as described with regard to FIG. 7) to identify first UE 802. For example, first UE 802 may select a media access control address as its UE identifier.

In cases in which group manager 806 provides the UE identifier (e.g., in the security materials), group manager 806 may provide a number of UE identifiers and a corresponding number of usage configurations for privacy protection of the UE identified by the associated UE identifier. The usage configurations may include a validity time of a respective UE identifier, a number of broadcast messages including the respective UE identifier, location information associated with the respective UE identifier, any combination thereof, and/or other information. For example, group manager 806 may provide a number of UE identifiers, each UE identifier to be used during a different validity time, or each to be used based on different location conditions. Additionally or alternatively, group manager 806 may provide messages that may include the different UE identifiers that may be broadcast by first UE 802.

First UE 802 may determine a traffic-key identifier (which may be referred to herein as a "traffic-key ID") based on a counter value, the group key and the group-key identifier. The traffic-key identifier may be indicative of the traffic key. First UE 802 may use the counter to ensure that the combination of the traffic-key identifier and the group-key identifier are unique. For instance, first UE 802 may set a unique value for a traffic-key identifier that has not been previously used together with a given group-key identifier. In one illustrative example, first UE 802 may select the value of the counter as the traffic-key identifier. In some cases, each time a new traffic-key identifier is derived, the counter may be incremented such that a new counter value is used.

After receiving key response 814 and determining the traffic-key identifier, first UE 802 may derive keys at a key derivation operation 818. For example, to perform the key derivation operation 818, the first UE 802 may derive a sidelink positioning traffic key (which may be referred to herein as a "traffic key"). The first UE 802 may derive the sidelink positioning traffic key based on a group key (received at key response 814), a group identifier of first UE 802, a UE identifier of first UE 802, and a traffic-key identifier. In some cases, such as if first UE 802 is provided with multiple UE identifiers (e.g., in the security materials provided by group manager 806), first UE 802 may derive a separate traffic key each time it broadcasts a message.

After generating the traffic key, first UE 802 may select an algorithm to use to generate a sidelink positioning encryption key (which may be referred to herein as an "encryption key") and a sidelink positioning integrity key (which may be referred to herein as an "integrity key"). For example, first UE 802 may select an algorithm identified by one of the algorithm identifiers provided by the group manager 806 in the security materials. In cases where the security materials included only one algorithm identifier, First UE 802 may select the identified algorithm. First UE 802 may then generate an encryption key and an integrity key based on the traffic key, using the algorithm identified by the algorithm identifier.

First UE 802 may generate a message including information associated with positioning-reference signaling (e.g., a positioning-assistance message). Further, first UE 802 may generate a message header for the message. In one illustrative example, the message header may include the group identifier of first UE 802, the UE identifier of first UE 802, the group-key identifier (associated with a group key used by first UE 802 in generating the traffic key), the traffic-key identifier, and the algorithm identifier indicative of the algorithm used to generate the encryption key and the integrity key. In some cases (e.g., cases in which first UE 802 selected a lower-layer identifier as the UE identifier of first UE 802), the header may not include the UE identifier of first UE 802 The UE identifier may be identified by a recipient in data associated with the lower layer.

After deriving the encryption key and the integrity key at key derivation operation 818, first UE 802 may calculate a message-authentication code (MAC) based on the message, the header of the message, the integrity key and a counter value (e.g., a binary counter). After calculating the MAC, first UE 802 may encrypt the message and the MAC using the encryption key at an encryption operation 820. At least part of the counter value may be included in the header.

After encrypting the message and the MAC at encryption operation 820, first UE 802 may transmit (at transmit operation 822) the header (including the group identifier of first UE 802, the UE identifier of first UE 802, the group-key identifier, the traffic-key identifier, the counter value used in generating the MAC, and the algorithm identifier), the encrypted message, and the encrypted MAC. In some cases, UEs 804 may expect the group identifier of first UE 802, the UE identifier of first UE 802, the group-key identifier, the traffic-key identifier, the counter value used in generating the MAC, and the algorithm identifier as a header, followed by an encrypted message, followed by an encrypted MAC. Transmit operation 822 may include broadcasting or group-casting the header, the encrypted message, and the encrypted MAC, e.g., in a packet.

In some cases, first UE 802 may transmit the UE identifier of first UE 802 (e.g., in the header of the packet). In some cases, for example, if the UE identifier is based on an identifier of first UE 802 that is used by a lower layer (e.g., a media access control layer) to identify first UE 802, first UE 802 may not transmit the UE identifier in the header because UEs 804 may be able to obtain the UE identifier from the lower layer.

By encrypting the message such that recipients without a key are unable to decrypt the message, first UE 802 may provide security to the message, which message may be a positioning-assistance message. In this way, first UE 802 may provide broadcast and/or groupcast security for sidelink positioning.

UEs 804, which may be intended recipients of the encrypted message, may receive keys to enable UEs 804 to decrypt the encrypted message such that UEs 804 may participate in sidelink positioning with first UE 802. UEs 804 may perform operations similar to, or the same as, some of the operations described with regard to first UE 802. For example, at service 830, UEs 804 may perform operations similar to, or the same as, service authorization 808. For example, at service 830, UEs 804 may obtain authorization to participate in sidelink positioning. Further, UEs 804 may send a key request similar to key request 810 (including respective group identifiers of UEs 804) and may receive a response similar to key response 814 (including respective security materials (including respective group keys, group-key identifiers, and one or more algorithm identifiers)).

UEs 804 may belong to the same group as first UE 802. Accordingly, UEs 804 may receive the same group identifier, the same group keys, the same group-key identifiers, and/or the same algorithm identifiers that first UE 802 received at key response 814.

Following service 830, and/or in response to receiving the transmission from first UE 802, UEs 804 may derive a traffic key, an encryption key, and an integrity key. At key derivation operation 832, UEs 804 may derive keys in a way that is similar to how first UE 802 derived the keys at key derivation operation 818. For example, UEs 804 may derive the traffic key based on a group key, a group identifier, a UE identifier of first UE 802, and a traffic-key identifier. UEs 804 may derive the traffic key based on a group key received at service 830. The selection of the group key to use in deriving the traffic key may be based on a correspondence between the group-key identifier received in the header transmitted at transmit operation 822 and the group-key identifier of the selected group key received at service 830. UEs 804 may derive the traffic key based on the group identifier received in the header transmitted at transmit operation 822. UEs 804 may be part of the same group and may have received the group identifier at service 830. UEs 804 may derive the traffic key based on a UE identifier received in the header transmitted at transmit operation 822. UEs 804 may derive the traffic key based on a traffic-key identifier received in the header transmitted at transmit operation 822.

The traffic key derived by UEs 804 at key derivation operation 832 may be the same as the traffic key derived by first UE 802 at key derivation operation 818 because first UE 802 and UEs 804 may use the same inputs (e.g., the same group key, group identifier, UE identifier (of first UE 802), and traffic-key identifier) and the same algorithm when deriving the traffic key.

UEs 804 may further derive the encryption key and the integrity key in a way that is similar to how first UE 802 derived keys at key derivation operation 818. In particular, UEs 804 may generate the encryption key and the integrity key based on the same traffic key (e.g., as independently derived at first UE 802 at key derivation operation 818 and UEs 804 at key derivation operation 832). Further, UEs 804 may derive the encryption key and the integrity key using the same algorithm used by first UE 802 in generating the encryption key and the integrity key. For example, first UE 802 may receive one or more algorithm identifiers from group manager 806 at key response 814. First UE 802 may select an algorithm identified by one of the received algorithm identifiers and use the selected algorithm to generate the encryption key and the integrity key. First UE 802 may transmit the algorithm identifier indicative of the algorithm used by first UE 802 to generate the encryption key and the integrity key in the header of the transmission sent at transmit operation 822. UEs 804 may use the algorithm identified by the algorithm identifier received in the header of the transmission at transmit operation 822 to derive the encryption key and the integrity key. Additionally, the algorithm identifier may have been included in the one or more algorithm identifiers received by UEs 804 in the security materials at service 830. In some cases, first UE 802 and UEs 804 may both only receive one algorithm identifier from group manager 806 at key response 814 and service 830 respectively. In such cases, first UE 802 may not include the algorithm identifier in the header of the transmission sent at transmit operation 822. In such cases, first UE 802 and UEs 804 may both use the algorithm identified by the one algorithm identifier received from group manager 806.

The encryption key and the integrity key derived by UEs 804 at key derivation operation 832 may be the same as the encryption key and the integrity key derived by first UE 802 at key derivation operation 818 because first UE 802 and UEs 804 may use the same input (i.e., the same traffic key) and the same algorithm when deriving the encryption key and the integrity key.

After deriving the encryption key and the integrity key at key derivation operation 832, UEs 804 may verify the integrity of the decrypted message at authentication operation 834. For example, UEs 804 may decrypt the message and the MAC using the encryption key. Further, UEs 804 may calculate an expected MAC using the integrity key and the counter (received in the header at transmit operation 822). UEs 804 may compare the received and decrypted MAC with the expected MAC. If the received and decrypted MAC matches the expected MAC, UEs 804 may authenticate the decrypted message.

By verifying the MAC, UEs 804 may verify the integrity of the decrypted message before trusting the message. In some cases, the message may be a positioning-assistance message or other type of message. In examples where the message is a positioning-assistance message, UEs 804 may provide broadcast and/or groupcast security for sidelink positioning.

FIG. 9 is a flowchart diagram illustrating an example of a process 900 for providing broadcast and/or groupcast security for sidelink positioning. One or more operations described with relation to process 900 may be performed by a UE, e.g., first UE 802 of FIG. 8.

At block 902, process 900 may include generating, at a user equipment (UE), a message including information associated with positioning-reference signaling. The message may be a positioning-assistance message. The information may include participant information indicating one or more intended recipients of a positioning reference signal (PRS), session information associated with communications between the UE and the one or more intended recipients, PRS measurements indicative of a signal strength of a received PRS, location information associate with a location of the UE, motion information associated with motion of the UE, or any combination thereof, and/or other information useful for sidelink positioning.

At block 904, process 900 may include obtaining a group identifier indicative of a group to which the UE belongs. In some cases, obtaining the group identifier at block 904 may include receiving the group identifier from a group management network entity, e.g., group manager 806 of FIG. 8. In some instances, the group management network entity may include, implement, or may be collocated with a KMF, which KMF may provide the group identifier to the group management network entity. In other instances, the group management network entity may be remote from a KMF which may provide the group identifier to the group management network entity. In other cases, the UE may be pre-configured with the group identifier and obtaining the group identifier at block 904 may include obtaining the group identifier from the memory of configuration space of the UE. At block 906, process 900 may include obtaining a group key and a group-key identifier associated with the group key. In some cases, obtaining the group key and the group-key identifier at block 906 may include receiving the group key and the group-key identifier from a group management network entity, e.g., group manager 806 of FIG. 8. In some instances, the group management network entity may include, implement, or may be collocated with a KMF, which KMF may provide the group key and the group-key identifier to the group management network entity. In other instances, the group management network entity may be remote from a KMF which may provide the group key and the group-key identifier to the group management network entity.

In some cases, receiving the group key and the group-key identifier at block 906 may include receiving a number of group keys and a number of respective group-key identifiers. In such cases, process 900 may also include receiving, from the group management network entity, a number of key-validity times, each of the number of key-validity times corresponding to a respective one of the number of group keys and a respective one of the number of group-key identifiers. Each of the number of key-validity times may be indicative of a time during which a respective one of the number of group keys is valid.

At block 908, process 900 may include obtaining a UE identifier indicative of the UE. The UE identifier may be, or may include, a group-member identifier identifying the UE within the group.

In some cases, obtaining the UE identifier at block 908 may include receiving the UE identifier and from a group management network entity. In some instances, the group management network entity may include, implement, or may be collocated with a KMF, which KMF may provide the UE identifier to the group management network entity. In other instances, the group management network entity may be remote from a KMF which may provide the UE identifier to the group management network entity. In such cases, generating the message header (as described with regard to block 914) may include generating the message header to include the UE identifier.

In some cases, obtaining the UE identifier at block 908 may include receiving a number of UE identifiers. In such cases, process 900 may additionally include receiving a respective usage configuration associated with each of the number of UE identifiers (e.g., a first usage configuration associated with a first UE identifier, a second usage configuration associated with a second UE identifier, a third usage configuration associated with a third UE identifier, and so on). Each of the usage configurations may respectively include: a validity time of a respective UE identifier, a number of broadcast messages including the respective UE identifier, location information associated with the respective UE identifier, any combination thereof, and/or other information. In such cases, generating the message header (as described with regard to block 914) may include generating the message header to include one of the number of UE identifiers according to the usage configurations.

In other cases, obtaining the UE identifier at block 908 may include generating the UE identifier by randomly selecting an identifier as the UE identifier. In such cases, generating the message header (as described with regard to block 914) may include generating the message header to include the UE identifier.

In still other cases, obtaining the UE identifier at block 908 may include selecting a Layer-2 identifier of the UE as the UE identifier.

At block 910, process 900 may include deriving a traffic key based on the group key, the group identifier, the UE identifier, any combination thereof, and/or based on other information. Process 900 may additionally include generating a traffic-key identifier indicative of the traffic key. Generating the traffic-key identifier may include generating the traffic-key identifier such that a combination of the traffic-key identifier and the group-key identifier is unique. Deriving the traffic key at block 910 may include deriving the traffic key further based on the traffic-key identifier. Generating the message header (as described with regard to block 914) may include generating the message header to include the traffic-key identifier.

At block 912, process 900 may include deriving an encryption key and an integrity key based on the traffic key. Process 900 may additionally include receiving, from a group management network entity, an encryption algorithm identifier, indicative of an encryption algorithm. Deriving the encryption key at block 912 may include deriving the encryption key further based on the encryption algorithm. Process 900 may additionally include receiving, from the group management network entity, an integrity algorithm identifier, indicative of an integrity algorithm. Deriving the integrity key at block 912 may include deriving the integrity key further based on the integrity algorithm. In some instances, the group management network entity may include, implement, or may be collocated with a KMF, which KMF may provide the encryption algorithm identifier and/or the integrity algorithm identifier to the group management network entity. In other instances, the group management network entity may be remote from a KMF which may provide the encryption algorithm identifier and/or the integrity algorithm identifier to the group management network entity.

At block 914, process 900 may include generating a message header for the message (e.g., the message generated at block 902). The message header may include at least the group identifier and/or the group-key identifier. In some cases (the cases described with regard to block 908, block 910, and block 916), the message header may additionally include: the UE identifier (as described with regard to block 908), the traffic-key identifier (as described with regard to block 910), a counter (as described with regard to block 916) any combination thereof, and/or other information.

At block 916, process 900 may include calculating a message-authentication code (MAC) using the integrity key, the message, and the message header. Calculating the MAC at block 916 may include calculating the MAC further based on a counter value. Generating the message header at block 914 may include generating the message header to include at least a part of the counter value. Calculating the MAC at block 916 may be further based on the traffic-key identifier (as described with regard to block 910).

At block 918, process 900 may include encrypting the message using the encryption key to generate an encrypted message. Encrypting the message at block 918 may be further based on the traffic-key identifier (as described with regard to block 910).

At block 920, process 900 may include encrypting the MAC using the encryption key to generate an encrypted MAC. Encrypting the MAC at block 920 may be further based on the traffic-key identifier (as described with regard to block 910).

At block 922, process 900 may include transmitting the message header, the encrypted message, and the encrypted MAC. Transmitting the message header, the message, and the encrypted MAC may include broadcasting or groupcasting the message header, the message, and the encrypted MAC as or in a packet.

By encrypting the message such that recipients without a key are unable to decrypt the message, process 900 may provide security to the message, which message may be a positioning-assistance message. In this way, process 900 may provide broadcast and/or groupcast security for sidelink positioning.

FIG. 10 is a flowchart diagram illustrating an example of a process 1000 for providing security for broadcast and/or groupcast sidelink positioning. One or more operations described with relation to process 1000 may be performed by a UE, e.g., one or more of UEs 804 of FIG. 8.

At block 1002, process 1000 may include receiving, at a first UE from a second UE, a packet including an encrypted message, an encrypted MAC, and a message header. The message may include information associated with positioning-reference signaling. The message may be a positioning-assistance message. The information may include participant information indicating one or more intended recipients of a positioning reference signal (PRS), session information associated with communications between the UE and the one or more intended recipients, PRS measurements indicative of a signal strength of a received PRS, location information associate with a location of the UE, motion information associated with motion of the UE, or any combination thereof, and/or other information useful for sidelink positioning. The message header may include: a group identifier indicative of a group to which the second UE belongs, and a group-key identifier indicative of a group key. The message header may additionally include a traffic-key identifier and/or a counter value. The encrypted message, encrypted MAC, and message header received at block 1002 may be the same as, or substantially similar to the message header, the encrypted message, and the encrypted MAC transmitted at block 922 of process 900. At block 1004, process 1000 may include obtaining a group identifier. The group identifier may be indicative that the first UE also belongs to the group to which the second UE belongs. For example, the first UE may obtain the group identifier from another source at block 1004. The fact that the group identifier obtained by the first UE at block 1004 matches the group identifier in the message header received at block 1002 may indicate that the first UE belongs to the same group to which the second UE belongs.

In some cases, obtaining the group identifier at block 1004 may include receiving the group identifier from a group management network entity, e.g., group manager 806 of FIG. 8. In some instances, the group management network entity may include, implement, or may be collocated with a KMF, which KMF may provide the group identifier to the group management network entity. In other instances, the group management network entity may be remote from a KMF which may provide the group identifier to the group management network entity. In other cases, the UE may be pre-configured with the group identifier and obtaining the group identifier at block 1004 may include obtaining the group identifier from the memory of configuration space of the UE.

At block 1006, process 1000 may include obtaining a group key and a group-key identifier. The group-key identifier obtained at block 1006 may match the group-key identifier in the message header received at block 1002. The group-key identifier may indicate the group key received at block 1006.

In some cases, obtaining the group key and the group-key identifier at block 1006 may include receiving the group key and the group-key identifier from a group management network entity, e.g., group manager 806 of FIG. 8. In some instances, the group management network entity may include, implement, or may be collocated with a KMF, which KMF may provide the group key and the group-key identifier to the group management network entity. In other instances, the group management network entity may be remote from a KMF which may provide the group key and the group-key identifier to the group management network entity.

At block 1008, process 1000 may include deriving a traffic key based on the group key. The message header received at block 1002 may further include a UE identifier indicative of the second UE, a traffic-key identifier indicative of the traffic key, and a counter. Deriving the traffic key may include deriving the traffic key further based on the group identifier, the UE identifier, and the traffic-key identifier. The UE identifier may be, or may include, a group-member identifier identifying the second UE within the group.

At block 1010, process 1000 may include deriving an encryption key and an integrity key based on the traffic key. In some cases, process 1000 may additionally include receiving, from a group management network entity, an encryption algorithm identifier, indicative of an encryption algorithm. Deriving the encryption key at block 1010 may include deriving the encryption key further based on the encryption algorithm. In some cases, process 1000 may additionally include receiving, from the group management network entity, an integrity algorithm identifier, indicative of an integrity algorithm. Deriving the integrity key at block 1010 may include deriving the integrity key further based on the integrity algorithm. In some instances, the group management network entity may include, implement, or may be collocated with a KMF, which KMF may provide the encryption algorithm identifier and/or the integrity algorithm identifier to the group management network entity. In other instances, the group management network entity may be remote from a KMF which may provide the encryption algorithm identifier and/or the integrity algorithm identifier to the group management network entity.

In some cases, the message header received at block 1002 may include an encryption algorithm identifier. Deriving the encryption key at block 1010 may include deriving the encryption key further based on the encryption algorithm identified by the encryption algorithm identifier received in the message header. In some cases, the message header received at block 1002 may include an integrity algorithm identifier. Deriving the integrity key at block 1010 may include deriving the integrity key further based on the integrity algorithm identified by the integrity algorithm identifier received in the message header.

At block 1012, process 1000 may include decrypting the encrypted message using the encryption key to generate a decrypted message. The message header may further include a traffic-key identifier indicative of the traffic key and a counter. Decrypting the encrypted message at block 1012 may further include decrypting the encrypted message further using the traffic-key identifier and the counter.

At block 1014, process 1000 may include decrypting the encrypted MAC using the encryption key to generate a decrypted MAC. The message header may further include a traffic-key identifier indicative of the traffic key and a counter. Decrypting the encrypted MAC at block 1014 may further include decrypting the encrypted MAC further using the traffic-key identifier and the counter.

At block 1016, process 1000 may include calculating an expected MAC based on the integrity key. Calculating the expected MAC at block 1016 may include calculating the expected MAC further based on a traffic-key identifier indicative of the traffic key and a counter value. The traffic-key identifier and the counter value may be received in the message header at block 1002.

At block 1018, process 1000 verifying integrity of the decrypted message by comparing the decrypted MAC with the expected MAC.

By verifying the MAC, process 1000 may verify the integrity of the decrypted message before trusting the message, which message may be a positioning-assistance message. In this way, process 1000 may provide broadcast and/or groupcast security for sidelink positioning.

Modifications, additions, or omissions may be made to the processes described herein (e.g., process 900, process 1000, and/or other process described herein) without departing from the scope of the disclosure. For example, the operations of process 900 and/or process 1000 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

In some examples, the processes described herein (e.g., process 900, process 1000, and/or other process described herein) may be performed by a computing device or apparatus (e.g., a UE, a base station, etc.). In one example, the process 900 and/or the process 1000 may be performed by a wireless communication device, such as a UE (e.g., the vehicle 404 of FIG. 4, a mobile device, and/or other UE or device). In another example, the process 900 and/or the process 1000 may be performed by a computing device with the computing system 1100 shown in FIG. 11. For instance, a wireless communication device (e.g., the vehicle 404 of FIG. 4, mobile device, and/or other UE or device) with the computing architecture shown in FIG. 11 may include the components of the UE and may implement the operations of process 900 and/or the operations of process 1000.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The processes described herein (e.g., process 900, process 1000, and/or other process described herein) are illustrated as logical flow diagrams, the operation of which represents a sequence of operations that may be implemented in hardware, computer instructions, or a combination thereof.

In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process processes described herein (e.g., process 900, process 1000, and/or other process described herein) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
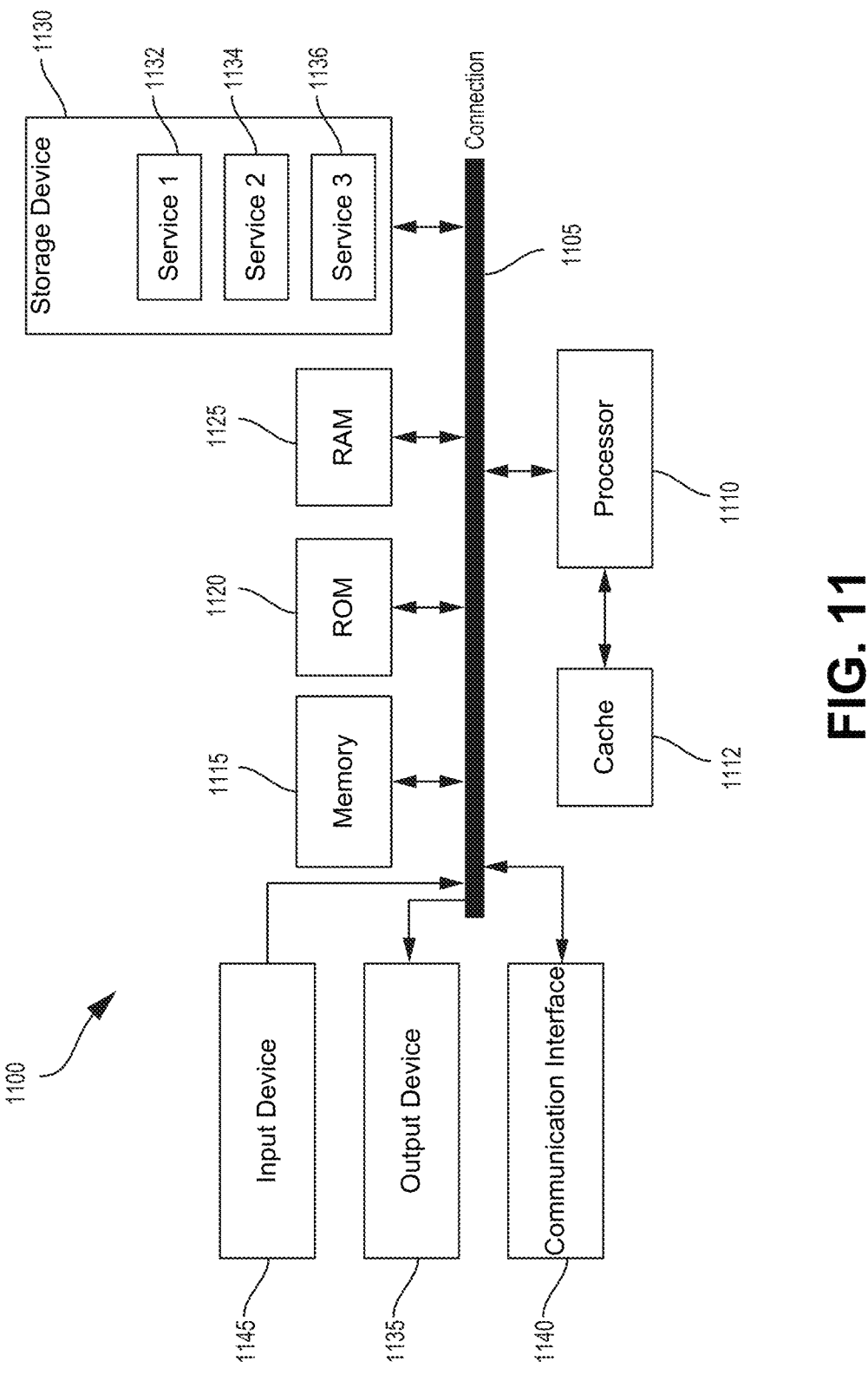
FIG. 11 is a block diagram illustrating an example of a computing system, according to aspects of the disclosure.

FIG. 11 is a diagram illustrating an example of a system for implementing certain aspects of the present technology. In particular, FIG. 11 illustrates an example of computing system 1100, which may be for example any computing device making up internal computing system, a remote computing system, a camera, or any component thereof in which the components of the system are in communication with each other using connection 1105. Connection 1105 may be a physical connection using a bus, or a direct connection into processor 1110, such as in a chipset architecture. Connection 1105 may also be a virtual connection, networked connection, or logical connection.

In some embodiments, computing system 1100 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 1100 includes at least one processing unit (CPU or processor) 1110 and connection 1105 that communicatively couples various system components including system memory 1115, such as read-only memory (ROM) 1120 and random-access memory (RAM) 1125 to processor 1110. Computing system 1100 may include a cache 1112 of high-speed memory connected directly with, in close proximity to, or integrated as part of processor 1110.

Processor 1110 may include any general-purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which may represent any number of input mechanisms, such as a microphone for speech, a touch-sensitive screen for gesture or graphical input, keyboard, mouse, motion input, speech, etc. Computing system 1100 may also include output device 1135, which may be one or more of a number of output mechanisms. In some instances, multimodal systems may enable a user to provide multiple types of input/output to communicate with computing system 1100.

Computing system 1100 may include communications interface 1140, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EE-PROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L#) cache), resistive random-access memory (RRAM/ReRAM), phase change memory (PCM), spin transfer torque RAM (STT-RAM), another memory chip or cartridge, and/or a combination thereof.

The storage device 1130 may include software services, servers, services, etc., that when the code that defines such software is executed by the processor 1110, it causes the system to perform a function. In some embodiments, a hardware service that performs a particular function may include the software component stored in a computer-readable medium in connection with the necessary hardware components, such as processor 1110, connection 1105, output device 1135, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general-purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative examples of the disclosure include:

Aspect 1: A method of encrypting one or more messages, including: generating, at a user equipment (UE), a message including information associated with positioning-reference signaling; obtaining a group identifier indicative of a group to which the UE belongs; obtaining a group key and a group-key identifier associated with the group key; obtaining a UE identifier indicative of the UE; deriving a traffic key based on at least one of the group key, the group identifier, or the UE identifier; deriving an encryption key and an integrity key based on the traffic key; generating a message header for the message, the message header including at least one of the group identifier or the group-key identifier; calculating a message-authentication code (MAC) using the integrity key, the message, and the message header; encrypting the message using the encryption key to generate an encrypted message; encrypting the MAC using the encryption key to generate an encrypted MAC; and transmitting the message header, the encrypted message, and the encrypted MAC.

Aspect 2: The method of Aspect 1, wherein obtaining the group identifier includes receiving the group identifier from a group management network entity.

Aspect 3: The method of Aspect 2, wherein the group management network entity includes a key management function (KMF).

Aspect 4: The method of Aspect 1, wherein obtaining the group identifier includes configuring the UE with the group identifier.

Aspect 5: The method of any one of Aspects 1 to 4, wherein obtaining the group key and the group-key identifier includes receiving, from a group management network entity, the group key and the group-key identifier.

Aspect 6: The method of Aspect 5, wherein the group management network entity includes a key management function (KMF).

Aspect 7: The method of any one of Aspects 1 to 6, wherein receiving the group key and the group-key identifier includes receiving a number of group keys and a number of group-key identifiers, wherein the method further includes receiving, from the group management network entity, a number of key-validity times, each of the number of key-validity times corresponding to a respective one of the number of group keys and a respective one of the number of group-key identifiers, and wherein each of the number of key-validity times is indicative of a time during which a respective one of the number of group keys is valid.

Aspect 8: The method of any one of Aspects 1 to 7, wherein obtaining the UE identifier includes receiving the UE identifier and from a group management network entity, and wherein generating the message header includes generating the message header including the UE identifier.

Aspect 9: The method of Aspect 8, wherein receiving the UE identifier includes receiving a number of UE identifiers, wherein the method further includes receiving a usage configuration associated with each of the number of UE identifiers, wherein each of the usage configurations respectively includes at least one of: a validity time of a respective UE identifier, a number of broadcast messages including the respective UE identifier, or location information associated with the respective UE identifier, wherein generating the message header including the UE identifier includes generating the message header including one of the number of UE identifiers according to the usage configurations.

Aspect 10: The method of Aspect 8, wherein the group management network entity includes a key management function (KMF).

Aspect 11: The method of any one of Aspects 1 to 7, wherein obtaining the UE identifier includes generating the UE identifier by randomly selecting an identifier as the UE identifier, and wherein generating the message header includes generating the message header including the UE identifier.

Aspect 12: The method of any one of Aspects 1 to 7, wherein obtaining the UE identifier includes selecting a Layer-2 identifier of the UE as the UE identifier.

Aspect 13: The method of any one of Aspects 1 to 12, wherein the UE identifier includes a group-member identifier identifying the UE within the group.

Aspect 14: The method of any one of Aspects 1 to 13, further including generating, based on a counter value, a traffic-key identifier associated with the traffic key; wherein deriving the traffic key includes deriving the traffic key further based on the traffic-key identifier, and wherein generating the message header includes generating the message header including the traffic-key identifier.

Aspect 15: The method of Aspect 14, wherein generating the traffic-key identifier includes generating the traffic-key identifier such that a combination of the traffic-key identifier and the group-key identifier is unique.

Aspect 16: The method of any one of Aspects 1 to 15, further including receiving, from a group management network entity, an algorithm identifier, indicative of an encryption algorithm, wherein deriving the encryption key includes deriving the encryption key further based on the encryption algorithm.

Aspect 17: The method of any one of Aspects 1 to 16, further including receiving, from a group management network entity, an algorithm identifier, indicative of an integrity algorithm, wherein deriving the integrity key includes deriving the integrity key further based on the integrity algorithm.

Aspect 18: The method of any one of Aspects 1 to 17, wherein calculating the MAC includes calculating the MAC further based on a counter value, and wherein generating the message header includes generating the message header further including at least a part of the counter value.

Aspect 19: The method of any one of Aspects to 1 to 18, further including generating a traffic-key identifier indicative of the traffic key; wherein calculating the MAC includes calculating the MAC further based on a counter value and the traffic-key identifier, and wherein encrypting the message and encrypting the MAC includes encrypting the message and encrypting the MAC further based on the counter value and traffic-key identifier.

Aspect 20: The method of any one of Aspects 1 to 19, wherein the information associated with the positioning-reference signaling includes at least one of: participant information indicating one or more intended recipients of a positioning reference signal (PRS), session information associated with communications between the UE and the one or more intended recipients, PRS measurements indicative of a signal strength of a received PRS, location information associate with a location of the UE, or motion information associated with motion of the UE.

Aspect 21: A method of processing one or more packets, including: receiving, at a first user equipment (UE) from a second UE, a packet including an encrypted message including information associated with positioning-reference signaling, an encrypted message-authentication code (MAC), and a message header, the message header including: a group identifier indicative of a group to which the second UE belongs, and a group-key identifier indicative of a group key; obtaining a group identifier indicative that the first UE also belongs to the group to which the second UE belongs, obtaining the group key and the group-key identifier; deriving a traffic key based on the group key; deriving an encryption key and an integrity key based on the traffic key; decrypting the encrypted message using the encryption key to generate a decrypted message; decrypting the encrypted MAC using the encryption key to generate a decrypted MAC; calculating an expected MAC based on the integrity key; and verifying integrity of the decrypted message by comparing the decrypted MAC with the expected MAC.

Aspect 22: The method of Aspect 21, wherein obtaining the group identifier includes receiving the group identifier from a group management network entity.

Aspect 23: The method of Aspect 22, wherein the group management network entity includes a key management function (KMF).

Aspect 24: The method of Aspect 21, wherein obtaining the group identifier includes configuring the first UE with the group identifier.

Aspect 25: The method of any one of Aspects 21 to 24, wherein obtaining the group key and the group-key identifier includes receiving, from a group management network entity, the group key and the group-key identifier associated with the group key.

Aspect 26: The method of Aspect 25, wherein the group management network entity includes a key management function (KMF).

Aspect 27: The method of any one of Aspects 21 to 26, wherein the message header further includes a UE identifier indicative of the second UE, a traffic-key identifier indicative of the traffic key, and a counter, and wherein deriving the traffic key includes deriving the traffic key further based on the group identifier, the UE identifier, and the traffic-key identifier.

Aspect 28: The method of Aspect 27, wherein the UE identifier includes a group-member identifier identifying the second UE within the group.

Aspect 29: The method of any one of Aspects 21 to 28, further including receiving, from a group management network entity, an encryption algorithm identifier indicative of an encryption algorithm, wherein deriving the encryption key includes deriving the encryption key further based on the encryption algorithm.

Aspect 30: The method of Aspect 29, wherein the group management network entity includes a key management function (KMF).

Aspect 31: The method of any one of Aspects 21 to 30, wherein the message header further includes an encryption algorithm identifier indicative an encryption algorithm, and wherein deriving the encryption key includes deriving the encryption key further based on the encryption algorithm.

Aspect 32: The method of any one of Aspects 21 to 31, further including: receiving, from a group management network entity, an integrity algorithm identifier indicative of an integrity algorithm, wherein deriving the integrity key includes deriving the integrity key further based on the integrity algorithm.

Aspect 33: The method of Aspect 32, wherein the group management network entity includes a key management function (KMF).

Aspect 34: The method of any one of Aspects 21 to 33, wherein the message header further includes an integrity algorithm identifier indicative an integrity algorithm, and wherein deriving the integrity key includes deriving the integrity key further based on the integrity algorithm.

Aspect 35: The method of any one of Aspects 21 to 34, wherein the message header further includes a traffic-key identifier indicative of the traffic key and a counter, wherein decrypting the encrypted message further including decrypting the encrypted message further using the traffic-key identifier and the counter, and wherein decrypting the encrypted MAC further including decrypting the encrypted MAC further using the traffic-key identifier and the counter.

Aspect 36: The method of any one of Aspects 21 to 35, wherein calculating the expected MAC includes calculating the expected MAC further based on a traffic-key identifier indicative of the traffic key and a counter value.

Aspect 37: The method of any one of Aspects 21 to 36, wherein the information associated with the positioning-reference signaling includes at least one of: participant information indicating one or more intended recipients of a positioning reference signal (PRS), session information associated with communications between the UE and the one or more intended recipients, PRS measurements indicative of a signal strength of a received PRS, location information associate with a location of the UE, or motion information associated with motion of the UE.

Aspect 38. An apparatus including at least one memory and at least one processor coupled to the at least one memory, wherein the at least one processor is configured to perform operations according to any of Aspects 1 to 20.

Aspect 39. A non-transitory computer-readable storage medium having stored thereon instructions which, when executed by one or more processors, cause the one or more processors to perform operations according to any of Aspects 1 to 20.

Aspect 40. An apparatus comprising one or more means for performing operations according to any of Aspects 1 to 20.

Aspect 41. An apparatus including at least one memory and at least one processor coupled to the at least one memory, wherein the at least one processor is configured to perform operations according to any of Aspects 21 to 37.

Aspect 42. A non-transitory computer-readable storage medium having stored thereon instructions which, when executed by one or more processors, cause the one or more processors to perform operations according to any of Aspects 21 to 37.

Aspect 43. An apparatus comprising one or more means for performing operations according to any of Aspects 21 to 37.

Aspect 44. An apparatus for encrypting one or more messages, the apparatus comprising: at least one memory; and at least one processor coupled to the at least one memory and configured to: generate, at a user equipment (UE), a message including information associated with positioning-reference signaling; obtain a group identifier indicative of a group to which the UE belongs; obtain a group key and a group-key identifier associated with the group key; obtain a UE identifier indicative of the UE; derive a traffic key based on at least one of the group key, the group identifier, or the UE identifier; derive an encryption key and an integrity key based on the traffic key; generate a message header for the message, the message header comprising at least one of the group identifier or the group-key identifier; calculate a message-authentication code (MAC) using the integrity key, the message, and the message header; encrypt the message using the encryption key to generate an encrypted message; encrypt the MAC using the encryption key to generate an encrypted MAC; and cause a transmitter to transmit the message header, the encrypted message, and the encrypted MAC.

Aspect 45. The apparatus of aspect 44, wherein, to obtain the group identifier, the at least one processor is configured to receive the group identifier from a group management network entity.

Aspect 46. The apparatus of aspect 44, wherein, to obtain the group identifier, the at least one processor is configured to configure the UE with the group identifier.

Aspect 47. The apparatus of aspect 44, wherein, to obtain the group key and the group-key identifier, the at least one processor is configured to receive, from a group management network entity, the group key and the group-key identifier.

Aspect 48. The apparatus of aspect 4, wherein: to receive the group key and the group-key identifier, the at least one processor is configured to receive a number of group keys and a number of group-key identifiers; the at least one processor is further configured to receive, from the group management network entity, a number of key-validity times, each of the number of key-validity times corresponding to a respective one of the number of group keys and a respective one of the number of group-key identifiers; and each of the number of key-validity times is indicative of a time during which a respective one of the number of group keys is valid.

Aspect 49. The apparatus of aspect 44, wherein: to obtain the UE identifier, the at least one processor is configured to receive the UE identifier from a group management network entity; and to generate the message header, the at least one processor is configured to generate the message header including the UE identifier.

Aspect 50. The apparatus of aspect 49, wherein: to receive the UE identifier, the at least one processor is configured to receive a number of UE identifiers; the at least one processor is further configured to receive a respective usage configuration associated with each of the number of UE identifiers; each respective usage configuration respectively comprises at least one of: a validity time of a respective UE identifier, a number of broadcast messages including the respective UE identifier, or location information associated with the respective UE identifier; and to generate the message header including the UE identifier, the at least one processor is configured to generate the message header including one of the number of UE identifiers according to the usage configurations.

Aspect 51. The apparatus of aspect 44, wherein: to obtain the UE identifier, the at least one processor is configured to generate the UE identifier by randomly selecting an identifier as the UE identifier; and to generate the message header, the at least one processor is configured to generate the message header including the UE identifier.

Aspect 52. The apparatus of aspect 44, wherein, to obtain the UE identifier, the at least one processor is configured to select a Layer-2 identifier of the UE as the UE identifier.

Aspect 53. The apparatus of aspect 44, wherein the UE identifier comprises a group-member identifier identifying the UE within the group.

Aspect 54. The apparatus of aspect 44, wherein: the at least one processor is further configured to generate, based on a counter value, a traffic-key identifier associated with the traffic key; to derive the traffic key, the at least one processor is configured to derive the traffic key further based on the traffic-key identifier, and to generate the message header, the at least one processor is configured to generate the message header including the traffic-key identifier.

Aspect 55. The apparatus of aspect 54, wherein, to generate the traffic-key identifier, the at least one processor is configured to generate the traffic-key identifier such that a combination of the traffic-key identifier and the group-key identifier is unique.

Aspect 56. The apparatus of aspect 44, wherein: the at least one processor is further configured to receive, from a group management network entity, an algorithm identifier, indicative of an encryption algorithm; and to derive the encryption key, the at least one processor is configured to derive the encryption key further based on the encryption algorithm.

Aspect 57. The apparatus of aspect 44, wherein: the at least one processor is further configured to receive, from a group management network entity, an algorithm identifier, indicative of an integrity algorithm; and to derive the integrity key, the at least one processor is configured to derive the integrity key further based on the integrity algorithm.

Aspect 58. The apparatus of aspect 44, wherein: to calculate the MAC, the at least one processor is configured to calculate the MAC further based on a counter value; and to generate the message header, the at least one processor is configured to generate the message header further including at least a part of the counter value.

Aspect 59. The apparatus of aspect 44, wherein: the at least one processor is further configured to generate a traffic-key identifier indicative of the traffic key; to calculate the MAC, the at least one processor is configured to calculate the MAC further based on a counter value and the traffic-key identifier, and to encrypt the message and to encrypt the MAC, the at least one processor is configured to encrypt the message and encrypt the MAC further based on the counter value and traffic-key identifier.

Aspect 60. The apparatus of aspect 44, wherein the information associated with the positioning-reference signaling comprises at least one of: participant information indicating one or more intended recipients of a positioning reference signal (PRS), session information associated with communications between the UE and the one or more intended recipients, PRS measurements indicative of a signal strength of a received PRS, location information associated with a location of the UE, or motion information associated with motion of the UE.

Aspect 61. An apparatus for processing one or more packets, the apparatus comprising: at least one memory; and at least one processor coupled to the at least one memory and configured to: receive, at a first user equipment (UE) from a second UE, a packet including an encrypted message including information associated with positioning-reference signaling, an encrypted message-authentication code (MAC), and a message header, the message header comprising: a group identifier indicative of a group to which the second UE belongs, and a group-key identifier indicative of a group key; obtain a group identifier indicative that the first UE also belongs to the group to which the second UE belongs; obtain the group key and the group-key identifier; derive a traffic key based on the group key; derive an encryption key and an integrity key based on the traffic key; decrypt the encrypted message using the encryption key to generate a decrypted message; decrypt the encrypted MAC using the encryption key to generate a decrypted MAC; calculate an expected MAC based on the integrity key; and verify integrity of the decrypted message by comparing the decrypted MAC with the expected MAC.

Aspect 62. The apparatus of aspect 61, wherein to obtain the group identifier the at least one processor is configured to receive the group identifier from a group management network entity.

Aspect 63. The apparatus of aspect 61, wherein, to obtain the group identifier, the at least one processor is configured to configure the first UE with the group identifier.

Aspect 64. The apparatus of aspect 61, wherein, to obtain the group key and the group-key identifier, the at least one processor is configured to receive, from a group management network entity, the group key and the group-key identifier associated with the group key.

Aspect 65. The apparatus of aspect 61, wherein: the message header further comprises a UE identifier indicative of the second UE, a traffic-key identifier indicative of the traffic key, and a counter; and to derive the traffic key, the at least one processor is configured to derive the traffic key further based on the group identifier, the UE identifier, and the traffic-key identifier.

Aspect 66. The apparatus of aspect 65, wherein the UE identifier comprises a group-member identifier identifying the second UE within the group.

Aspect 67. The apparatus of aspect 16, wherein: the at least one processor is further configured to receive, from a group management network entity, an encryption algorithm identifier indicative of an encryption algorithm; and to derive the encryption key, the at least one processor is configured to derive the encryption key further based on the encryption algorithm.

Aspect 68. The apparatus of aspect 61, wherein: the message header further comprises an encryption algorithm identifier indicative an encryption algorithm; and to derive the encryption key, the at least one processor is configured to derive the encryption key further based on the encryption algorithm.

Aspect 69. The apparatus of aspect 61, wherein: the at least one processor is further configured to receive, from a group management network entity, an integrity algorithm identifier indicative of an integrity algorithm; and to derive the integrity key, the at least one processor is configured to derive the integrity key further based on the integrity algorithm.

Aspect 70. The apparatus of aspect 61, wherein: the message header further comprises an integrity algorithm identifier indicative an integrity algorithm; and to derive the integrity key, the at least one processor is configured to derive the integrity key further based on the integrity algorithm.

Aspect 71. The apparatus of aspect 61, wherein: the message header further comprises a traffic-key identifier indicative of the traffic key and a counter; to decrypt the encrypted message, the at least one processor is configured to decrypt the encrypted message further using the traffic-key identifier and the counter; and to decrypt the encrypted MAC further, the at least one processor is configured to decrypt the encrypted MAC further using the traffic-key identifier and the counter.

Aspect 72. The apparatus of aspect 61, wherein, to calculate the expected MAC, the at least one processor is configured to calculate the expected MAC further based on a traffic-key identifier indicative of the traffic key and a counter value.

Aspect 73. The apparatus of aspect 61, wherein the information associated with the positioning-reference signaling comprises at least one of: participant information indicating one or more intended recipients of a positioning reference signal (PRS), session information associated with communications between the UE and the one or more intended recipients, PRS measurements indicative of a signal strength of a received PRS, location information associate with a location of the UE, or motion information associated with motion of the UE.

What is claimed is:

1. An apparatus for encrypting one or more messages, the apparatus comprising:
at least one memory; and
at least one processor coupled to the at least one memory and configured to:
generate, at a first user equipment (UE), a message including information associated with positioning-reference signaling;
obtain, at the first UE, a group identifier indicative of a group to which the first UE belongs;
obtain, at the first UE, a group key and a group-key identifier associated with the group key;
obtain, at the first UE, a UE identifier indicative of the first UE;
derive, at the first UE, a traffic key based on at least one of the group key, the group identifier, or the UE identifier;
derive, at the first UE, an encryption key and an integrity key based on the traffic key;
generate, at the first UE, a message header for the message, the message header comprising at least one of the group identifier or the group-key identifier;
calculate, at the first UE, a message-authentication code (MAC) using the integrity key, the message, and the message header;
encrypt, at the first UE, the message using the encryption key to generate an encrypted message;
encrypt, at the first UE, the MAC using the encryption key to generate an encrypted MAC; and cause a transmitter to transmit, from the first UE to a second UE, the message header, the encrypted message, and the encrypted MAC.

2. The apparatus of claim 1, wherein, to obtain the group identifier, the at least one processor is configured to receive the group identifier from a group management network entity.

3. The apparatus of claim 1, wherein, to obtain the group identifier, the first UE is pre-configured with the group identifier.

4. The apparatus of claim 1, wherein, to obtain the group key and the group-key identifier, the at least one processor is configured to receive, from a group management network entity, the group key and the group-key identifier.

5. The apparatus of claim 4, wherein:
to receive the group key and the group-key identifier, the at least one processor is configured to receive a number of group keys and a number of group-key identifiers;
the at least one processor is further configured to receive, from the group management network entity, a number of key-validity times, each of the number of key-validity times corresponding to a respective one of the number of group keys and a respective one of the number of group-key identifiers; and
each of the number of key-validity times is indicative of a time during which a respective one of the number of group keys is valid.

6. The apparatus of claim 1, wherein:
to obtain the UE identifier, the at least one processor is configured to receive the UE identifier from a group management network entity; and
to generate the message header, the at least one processor is configured to generate the message header including the UE identifier.

7. The apparatus of claim 6, wherein:
to receive the UE identifier, the at least one processor is configured to receive a number of UE identifiers;
the at least one processor is further configured to receive a respective usage configuration associated with each of the number of UE identifiers;
each respective usage configuration respectively comprises at least one of: a validity time of a respective UE identifier, a number of broadcast messages including the respective UE identifier, or location information associated with the respective UE identifier; and
to generate the message header including the UE identifier, the at least one processor is configured to generate the message header including one of the number of UE identifiers according to the usage configurations.

8. The apparatus of claim 1, wherein:
to obtain the UE identifier, the at least one processor is configured to generate the UE identifier by randomly selecting an identifier as the UE identifier; and
to generate the message header, the at least one processor is configured to generate the message header including the UE identifier.

9. The apparatus of claim 1, wherein, to obtain the UE identifier, the at least one processor is configured to select a Layer-2 identifier of the first UE as the UE identifier.

10. The apparatus of claim 1, wherein the UE identifier comprises a group-member identifier identifying the first UE within the group.

11. The apparatus of claim 1, wherein:
the at least one processor is further configured to generate, based on a counter value, a traffic-key identifier associated with the traffic key;

to derive the traffic key, the at least one processor is configured to derive the traffic key further based on the traffic-key identifier, and to generate the message header, the at least one processor is configured to generate the message header including the traffic-key identifier.

12. The apparatus of claim 11, wherein, to generate the traffic-key identifier, the at least one processor is configured to generate the traffic-key identifier such that a combination of the traffic-key identifier and the group-key identifier is unique.

13. The apparatus of claim 1, wherein:

the at least one processor is further configured to receive, from a group management network entity, an algorithm identifier, indicative of an encryption algorithm; and to derive the encryption key, the at least one processor is configured to derive the encryption key further based on the encryption algorithm.

14. The apparatus of claim 1, wherein:

the at least one processor is further configured to receive, from a group management network entity, an algorithm identifier, indicative of an integrity algorithm; and to derive the integrity key, the at least one processor is configured to derive the integrity key further based on the integrity algorithm.

15. The apparatus of claim 1, wherein:

to calculate the MAC, the at least one processor is configured to calculate the MAC further based on a counter value; and to generate the message header, the at least one processor is configured to generate the message header further including at least a part of the counter value.

16. The apparatus of claim 1, wherein:

the at least one processor is further configured to generate a traffic-key identifier indicative of the traffic key;

to calculate the MAC, the at least one processor is configured to calculate the MAC further based on a counter value and the traffic-key identifier, and to encrypt the message and to encrypt the MAC, the at least one processor is configured to encrypt the message and encrypt the MAC further based on the counter value and traffic-key identifier.

17. The apparatus of claim 1, wherein the information associated with the positioning-reference signaling comprises at least one of: participant information indicating one or more intended recipients of a positioning reference signal (PRS), session information associated with communications between the first UE and the one or more intended recipients, PRS measurements indicative of a signal strength of a received PRS, location information associated with a location of the first UE, or motion information associated with motion of the first UE.

18. An apparatus for processing one or more packets, the apparatus comprising:

at least one memory; and at least one processor coupled to the at least one memory and configured to:

receive, at a first user equipment (UE) from a second UE, a packet including an encrypted message including information associated with positioning-reference signaling, an encrypted message-authentication code (MAC), and a message header, the message header comprising: a group identifier indicative of a group to which the second UE belongs, and a group-key identifier indicative of a group key;

obtain, at the first UE, a group identifier indicative that the first UE also belongs to the group to which the second UE belongs;

obtain, at the first UE, the group key and the group-key identifier;

derive, at the first UE, a traffic key based on the group key;

derive, at the first UE, an encryption key and an integrity key based on the traffic key;

decrypt, at the first UE, the encrypted message using the encryption key to generate a decrypted message;

decrypt, at the first UE, the encrypted MAC using the encryption key to generate a decrypted MAC;

calculate, at the first UE, an expected MAC based on the integrity key; and verify, at the first UE, integrity of the decrypted message by comparing the decrypted MAC with the expected MAC.

19. The apparatus of claim 18, wherein to obtain the group identifier the at least one processor is configured to receive the group identifier from a group management network entity.

20. The apparatus of claim 18, wherein, to obtain the group identifier, the at least one processor is configured to configure the first UE with the group identifier.

21. The apparatus of claim 18, wherein, to obtain the group key and the group-key identifier, the at least one processor is configured to receive, from a group management network entity, the group key and the group-key identifier associated with the group key.

22. The apparatus of claim 18, wherein:

the message header further comprises a UE identifier indicative of the second UE, a traffic-key identifier indicative of the traffic key, and a counter; and to derive the traffic key, the at least one processor is configured to derive the traffic key further based on the group identifier, the UE identifier, and the traffic-key identifier.

23. The apparatus of claim 22, wherein the UE identifier comprises a group-member identifier identifying the second UE within the group.

24. The apparatus of claim 18, wherein:

the at least one processor is further configured to receive, from a group management network entity, an encryption algorithm identifier indicative of an encryption algorithm; and to derive the encryption key, the at least one processor is configured to derive the encryption key further based on the encryption algorithm.

25. The apparatus of claim 18, wherein:

the message header further comprises an encryption algorithm identifier indicative an encryption algorithm; and to derive the encryption key, the at least one processor is configured to derive the encryption key further based on the encryption algorithm.

26. The apparatus of claim 18, wherein:

the at least one processor is further configured to receive, from a group management network entity, an integrity algorithm identifier indicative of an integrity algorithm; and to derive the integrity key, the at least one processor is configured to derive the integrity key further based on the integrity algorithm.

27. The apparatus of claim 18, wherein:

the message header further comprises an integrity algorithm identifier indicative an integrity algorithm; and to derive the integrity key, the at least one processor is configured to derive the integrity key further based on the integrity algorithm.

28. The apparatus of claim 18, wherein:

the message header further comprises a traffic-key identifier indicative of the traffic key and a counter;

to decrypt the encrypted message, the at least one processor is configured to decrypt the encrypted message further using the traffic-key identifier and the counter; and to decrypt the encrypted MAC further, the at least one processor is configured to decrypt the encrypted MAC further using the traffic-key identifier and the counter.

29. The apparatus of claim 18, wherein, to calculate the expected MAC, the at least one processor is configured to calculate the expected MAC further based on a traffic-key identifier indicative of the traffic key and a counter value.

30. The apparatus of claim 18, wherein the information associated with the positioning-reference signaling comprises at least one of: participant information indicating one or more intended recipients of a positioning reference signal (PRS), session information associated with communications between the second UE and the one or more intended recipients, PRS measurements indicative of a signal strength of a received PRS, location information associate with a location of the second UE, or motion information associated with motion of the second UE.

\* \* \* \* \*